(12) United States Patent
Russ

(10) Patent No.: US 7,032,232 B2
(45) Date of Patent: Apr. 18, 2006

(54) MEMORY STORAGE DISK HANDLING SYSTEM

(75) Inventor: Wray Russ, Brentwood, CA (US)

(73) Assignee: Microboards Technology, LLC, Chanhassen, MN (US)

( * ) Notice: Subject to any disclaimer, the term of this patent is extended or adjusted under 35 U.S.C. 154(b) by 339 days.

(21) Appl. No.: 10/334,607

(22) Filed: Dec. 30, 2002

(65) Prior Publication Data

US 2003/0095478 A1 May 22, 2003

Related U.S. Application Data

(63) Continuation-in-part of application No. 09/828,569, filed on Apr. 5, 2001, now Pat. No. 6,782,544, which is a continuation-in-part of application No. 09/088,652, filed on Jun. 1, 1998, now Pat. No. 6,337,842.

(51) Int. Cl.
 *G11B 17/08* (2006.01)
(52) U.S. Cl. ............... 720/719; 369/30.34; 369/30.55; 369/30.6
(58) Field of Classification Search ............. 414/788.1, 414/791.6, 792.7, 792.8, 792.9, 793.4, 794.7; 720/619; 369/30.34, 30.55, 30.57, 30.6
See application file for complete search history.

(56) References Cited

U.S. PATENT DOCUMENTS

| 1,058,144 | A | | 4/1913 | Blank |
| 2,296,013 | A | | 9/1942 | Bell |
| 2,304,437 | A | | 12/1942 | Bell |
| 2,328,703 | A | * | 9/1943 | Becwar .................. 74/1 R |
| 2,504,596 | A | | 4/1950 | Scriven et al. |
| 3,253,832 | A | * | 5/1966 | Tatter et al. ................ 369/208 |
| 3,288,471 | A | * | 11/1966 | Weedfall .................... 369/209 |
| 3,709,504 | A | * | 1/1973 | Sherwood .................. 369/207 |
| 3,892,415 | A | * | 7/1975 | Takahashi et al. .......... 369/209 |
| 4,168,069 | A | * | 9/1979 | Cukrowski .................. 369/209 |
| 4,195,961 | A | | 4/1980 | Waiblinger |
| 4,278,258 | A | | 7/1981 | Fujita et al. |
| 4,417,757 | A | | 11/1983 | Morrison |
| 4,470,137 | A | | 9/1984 | Tago |
| 4,504,186 | A | | 3/1985 | Richards |
| 4,559,623 | A | * | 12/1985 | Dennis ...................... 369/207 |

(Continued)

FOREIGN PATENT DOCUMENTS

JP 55087343 A * 7/1980

OTHER PUBLICATIONS

Ron Matusiak, "Buffalo State College Department of Technology Engineering Instructional Support." 12pp. from http://facstaff.buffalostate.edu/matusirc/public-html/index.html.*

(Continued)

*Primary Examiner*—William J Klimowicz
(74) *Attorney, Agent, or Firm*—Fish & Richardson, P.C.

(57) ABSTRACT

A disk dispenser including a spindle having a first end and a second end, the second end having a disk support foot arranged to support a stack of disks, wherein the disk support foot is movable from an extended position at which a portion of the disk support foot is axially extending beyond a diameter of the spindle for supporting a stack of disks and a withdrawn position at which the portion of the disk support foot is not substantially axially extending beyond the diameter of the spindle for loading the stack of disks onto the spindle; and a pusher for separating at least one disk from the stack of disks on the spindle.

25 Claims, 35 Drawing Sheets

U.S. PATENT DOCUMENTS

| | | |
|---|---|---|
| 4,595,481 A | 6/1986 | Allen et al. |
| 4,677,508 A | 6/1987 | Barton, Jr. et al. |
| 4,701,896 A * | 10/1987 | Allebest et al. ............. 720/615 |
| 4,726,615 A | 2/1988 | Goldberg |
| 4,735,540 A | 4/1988 | Allen et al. |
| 4,921,397 A | 5/1990 | Watanabe |
| 5,067,702 A | 11/1991 | Muraishi et al. |
| 5,110,167 A | 5/1992 | Friend |
| 5,123,005 A | 6/1992 | Kurosu |
| 5,130,959 A | 7/1992 | Wakatsuki et al. |
| 5,210,729 A | 5/1993 | Schmidt et al. |
| 5,218,375 A | 6/1993 | Hillman |
| 5,322,188 A | 6/1994 | Dodaro |
| 5,397,214 A | 3/1995 | Cheung |
| 5,490,020 A | 2/1996 | Albrecht et al. |
| 5,505,509 A | 4/1996 | Vance |
| 5,520,106 A | 5/1996 | Karlyn et al. |
| 5,520,107 A | 5/1996 | Airoldi |
| 5,537,376 A | 7/1996 | Ikuma |
| 5,583,839 A | 12/1996 | Choi |
| 5,692,878 A | 12/1997 | Freund |
| 5,721,715 A | 2/1998 | Mitani et al. |
| 5,734,629 A | 3/1998 | Lee et al. |
| 5,822,162 A | 10/1998 | Tannert |
| 5,857,710 A | 1/1999 | Leising et al. |
| 5,865,114 A | 2/1999 | Averill et al. |
| 5,888,433 A * | 3/1999 | Amo ......................... 264/1.33 |
| 5,914,918 A | 6/1999 | Lee et al. |
| 5,934,865 A * | 8/1999 | Meadows ................ 414/796.9 |
| 5,957,198 A | 9/1999 | Haynes |
| 6,075,758 A | 6/2000 | Wu |
| 6,113,345 A * | 9/2000 | Ashby ........................ 414/801 |
| 6,123,020 A | 9/2000 | Wolfer et al. |
| 6,134,213 A | 10/2000 | Suzuki et al. |
| 6,135,316 A | 10/2000 | Wolfer et al. |
| 6,147,960 A | 11/2000 | Wolfer et al. |
| 6,222,800 B1 | 4/2001 | Miller et al. |
| 6,782,544 B1 * | 8/2004 | Russ ......................... 720/619 |
| 2002/0003754 A1 | 1/2002 | Russ |
| 2003/0002400 A1 * | 1/2003 | Klein ..................... 369/30.55 |

OTHER PUBLICATIONS

EMEDIA Professional, "Buyers Guide to CD Duplication Systems—40 New towers, autoloaders, jukeboxes", Nov. 1997.

* cited by examiner

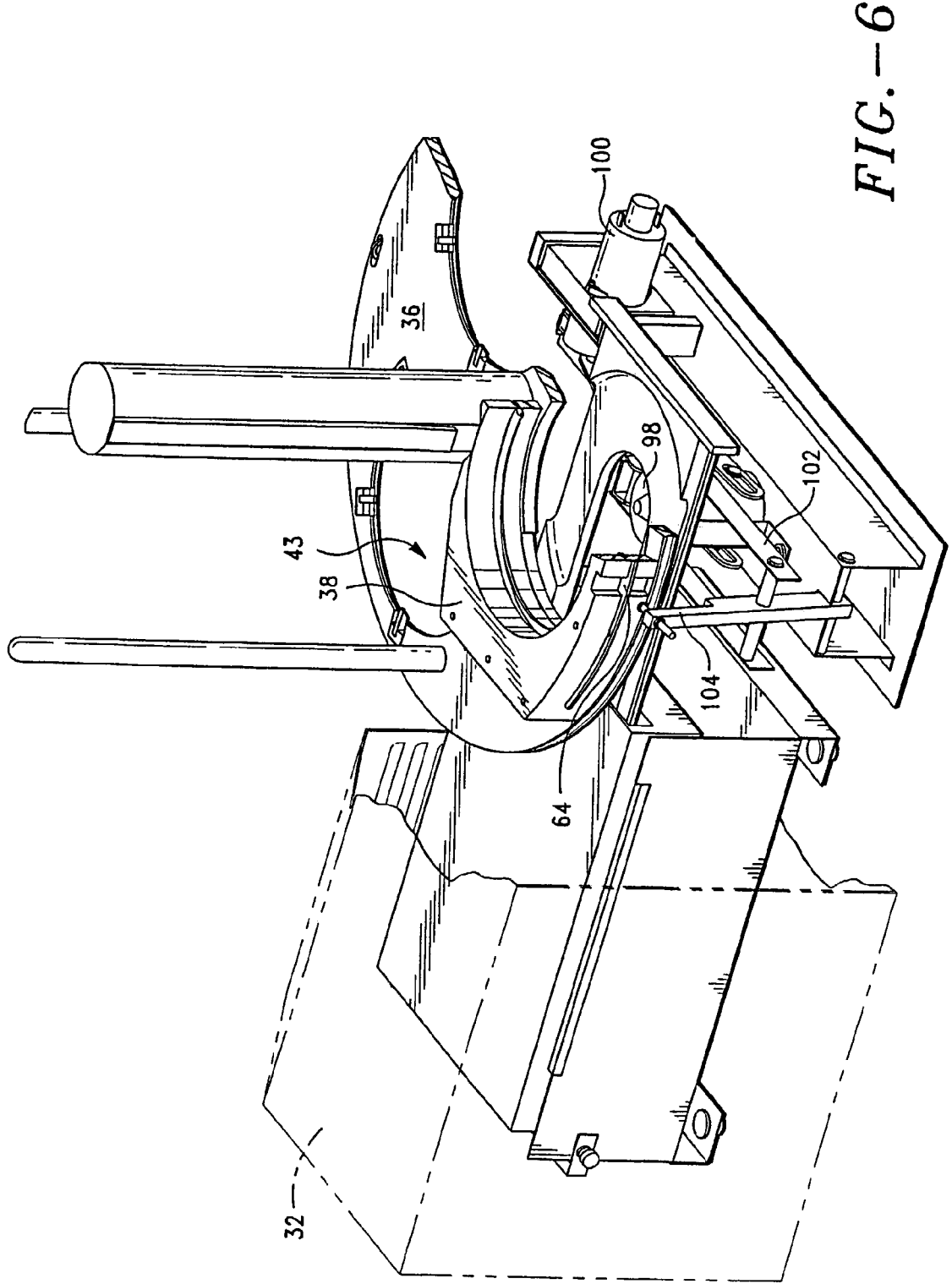

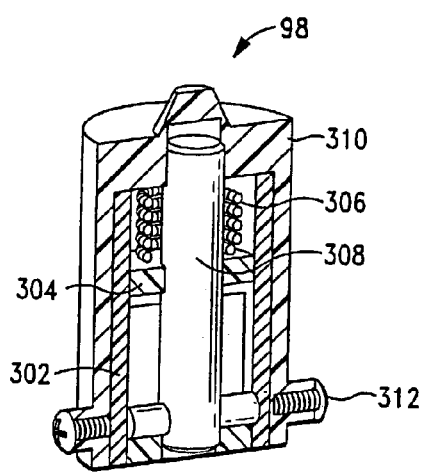
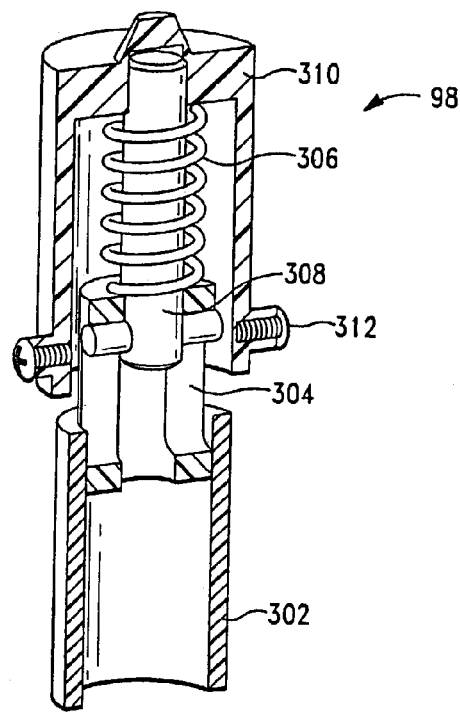
FIG.-32    FIG.-33
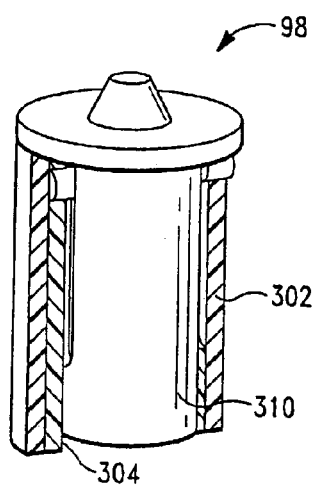
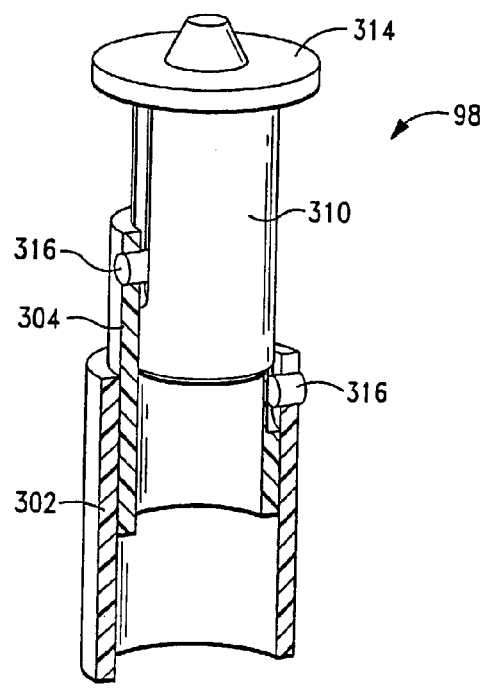
FIG.-34    FIG.-35

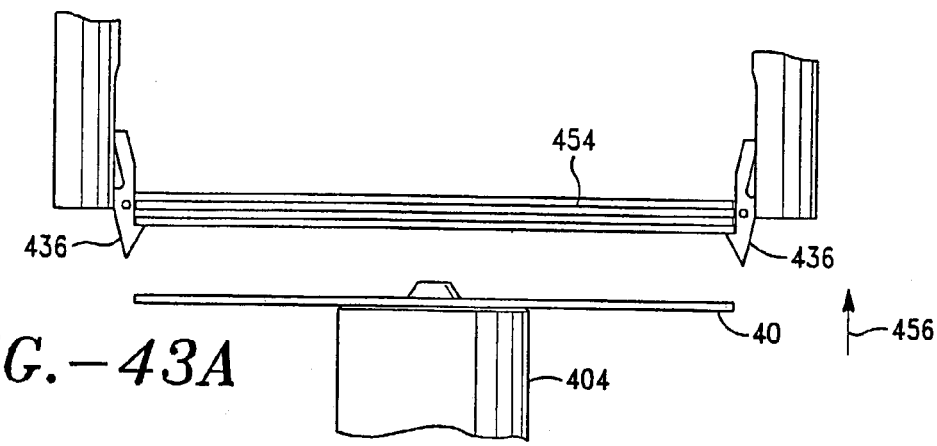
FIG.—43A
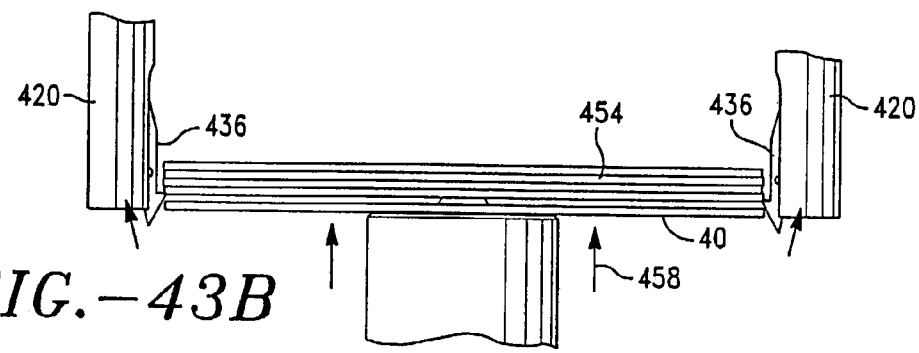
FIG.—43B
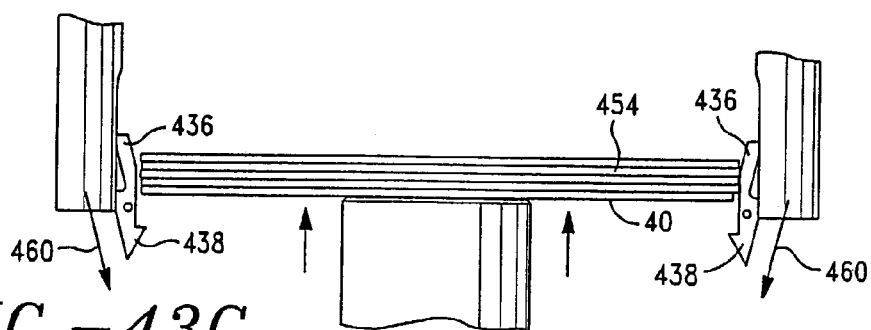
FIG.—43C
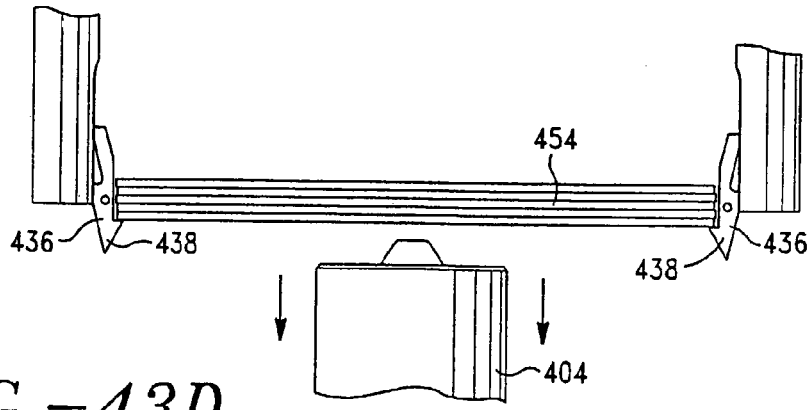
FIG.—43D

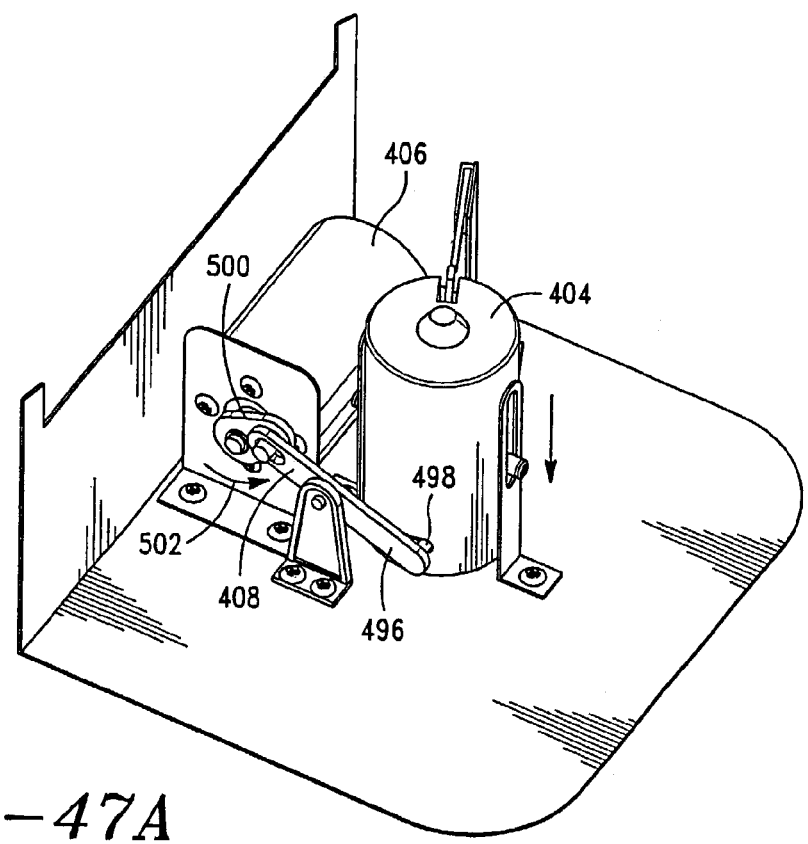
FIG.—47A
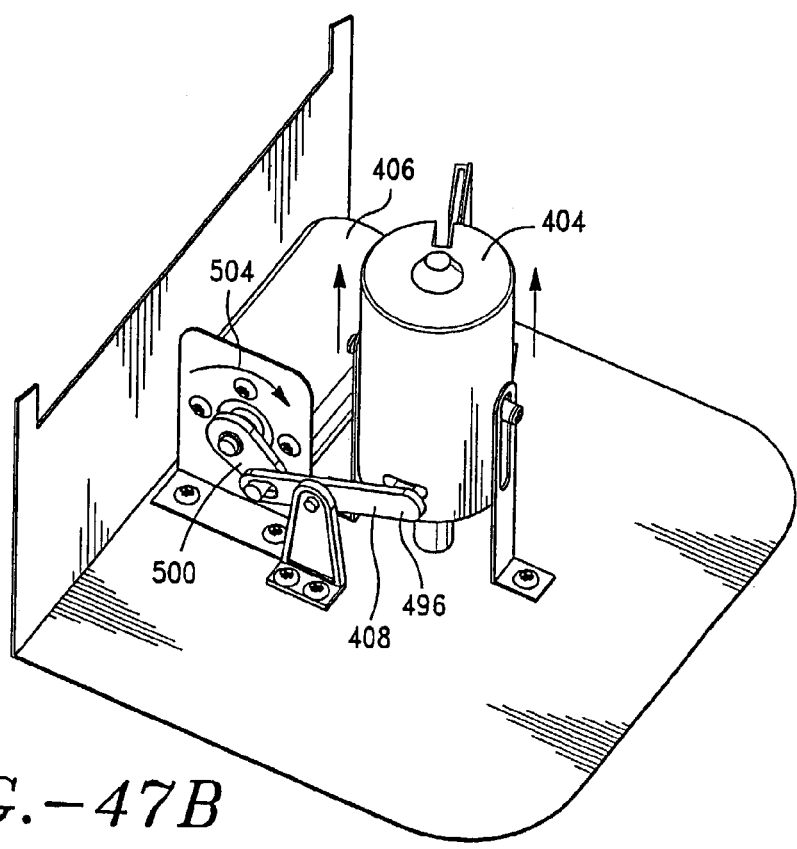
FIG.—47B

MEMORY STORAGE DISK HANDLING SYSTEM

CROSS-REFERENCE TO RELATED APPLICATIONS

This application is a continuation-in-part of commonly assigned U.S. patent application Ser. No. 09/828,569, filed Apr. 5, 2001 now U.S. Pat. No. 6,782,544, issued Aug. 24, 2004, which is a continuation-in-part of commonly assigned U.S. patent application Ser. No. 09/088,652, filed Jun. 1, 1998, now U.S. Pat. No. 6,337,842, issued May 7, 2002.

FIELD OF THE INVENTION

This invention relates to a disk dispenser and disk handling systems and particularly to systems for handling, printing, duplicating or replicating compact disks, DVD's, and the like.

BACKGROUND OF THE INVENTION

One of the most popular types of media is optical disks, such as compact disks and digital video disks, or digital versatile disks. The optical disk or CD has recently become a popular form of media for storing digital information, recording high quality audio and video information and also for recording computer software of various types. With advances in technology, it is now possible not only to read information from such optical media, but also to record digital information directly onto the media. For example, recordable compact disks (referred to as CD-Rs) may have digital information recorded on them by placing the CD-R into a compact disk recorder that receives the digital information from a computer. Such forms of optical media are thus particularly useful for data distribution and/or archiving.

Compact disks are standardized in two sizes and configurations, one having an overall diameter of 4.72 inches, a central hole of 0.59 inches, and a central region about the center hole of 1.50 inches in diameter, wherein no information is either printed or recorded. The other standard disk size is 3.5 inches in overall diameter, with a comparable central hole size and central region. In the case of disks for utilization in connection with computer processors, the recording formats and content are typically adapted to the particular generalized type of computer processor with which the disk is to operate. Some compact disks are recorded in such a way as to be usable with several different computer processor types, i.e., PC, Macintosh, etc. Disk handling systems typically move a single disk between a stack of disks and a workstation. Such systems are particularly useful for handling memory storage disks such as CD's, DVD's and the like. Common memory storage disk handling systems include data writers, label printers, or both.

Some disk handling systems employ robotic arms to handle the disks. Others rely upon a gantry, or double gantry system. Many systems slide disks from the top of a stack, or robotically lift disks from the top of the stack. Sliding disks from a stack may scratch the surface of the disk. Robotically lifting the disks from the stack may prevent scratches when the robot functions properly.

One drawback to robotic arms and gantry systems is that they have moving parts, which wear. Wear can ultimately cause system misalignment and failure of a gantry or robotic arm over time. Accordingly, the known robotic arm and gantry systems should be carefully maintained.

While the typical memory storage device systems are effective, users may desire more throughput, i.e., an increase in the number of disks handled per hour, and less maintenance. Accordingly, what is desired is a reliable way of increasing the throughput of a typical disk handling system. What is also desired is a low-maintenance memory storage device handling system.

SUMMARY OF THE INVENTION

According to one aspect of the present invention, a disk dispenser includes a spindle having a first end and a second end, the second end having a disk support foot arranged to support a stack of disks, wherein the disk support foot is movable from an extended position at which a portion of the disk support foot is axially extending beyond a diameter of the spindle for supporting a stack of disks and a withdrawn position at which the portion of the disk support foot is not substantially axially extending beyond the diameter of the spindle for loading the stack of disks onto the spindle; and a pusher for separating at least one disk from the stack of disks on the spindle.

In accordance with another aspect of the present invention, an apparatus for writing on a stack of disks, the apparatus includes a housing; a disk dispenser, the disk dispenser comprising: a spindle having a first end and a second end, the second end having a disk support foot for supporting a stack of disks, wherein the disk support foot is movable from an extended position arranged to support a stack of disks and a withdrawn position arranged to allow loading of the stack of disks over the disk support foot and onto the spindle; and a pusher for separating at least one disk from the stack of disks on the spindle; and a disk writer.

In accordance with a further aspect of the present invention, a method of dispensing a disk from a stack of disks, the method includes removing a disk dispenser from a housing; loading the disk dispenser with a stack of disks; placing the disk dispenser into the housing; and separating a lower-most disk from the stack of disks.

Still other objects, features, and attendant advantages of the present invention will become apparent to those skilled in the art from reading of the following detailed description of embodiments constructed in accordance therewith, taken in conjunction with the accompanying drawings.

BRIEF DESCRIPTION OF THE DRAWINGS

FIG. 6 shows a cutaway rear perspective view of the system of FIG. 1.

FIG. 10, FIG. 1 and FIG. 12 correspond with FIG. 7, FIG. 8 and FIG. 9, respectively, and show partial cross-sectional views of the disk dispenser from a reversed angle.

FIG. 32 and FIG. 33 show a perspective view of an elevator pin in accordance with the present invention in a retracted and extended configuration, respectively.

FIG. 34 and FIG. 35 show a perspective view of a variation of an elevator pin in accordance with the present invention in a retracted and extended configuration, respectively.

FIGS. 43A, 43B, 43C, and 43D show the operation of hopper with a disk guide having pawls.

FIGS. 47A and 47B show the linkage assembly of the present invention including a rocker arm.

DETAILED DESCRIPTION

Figure 1:
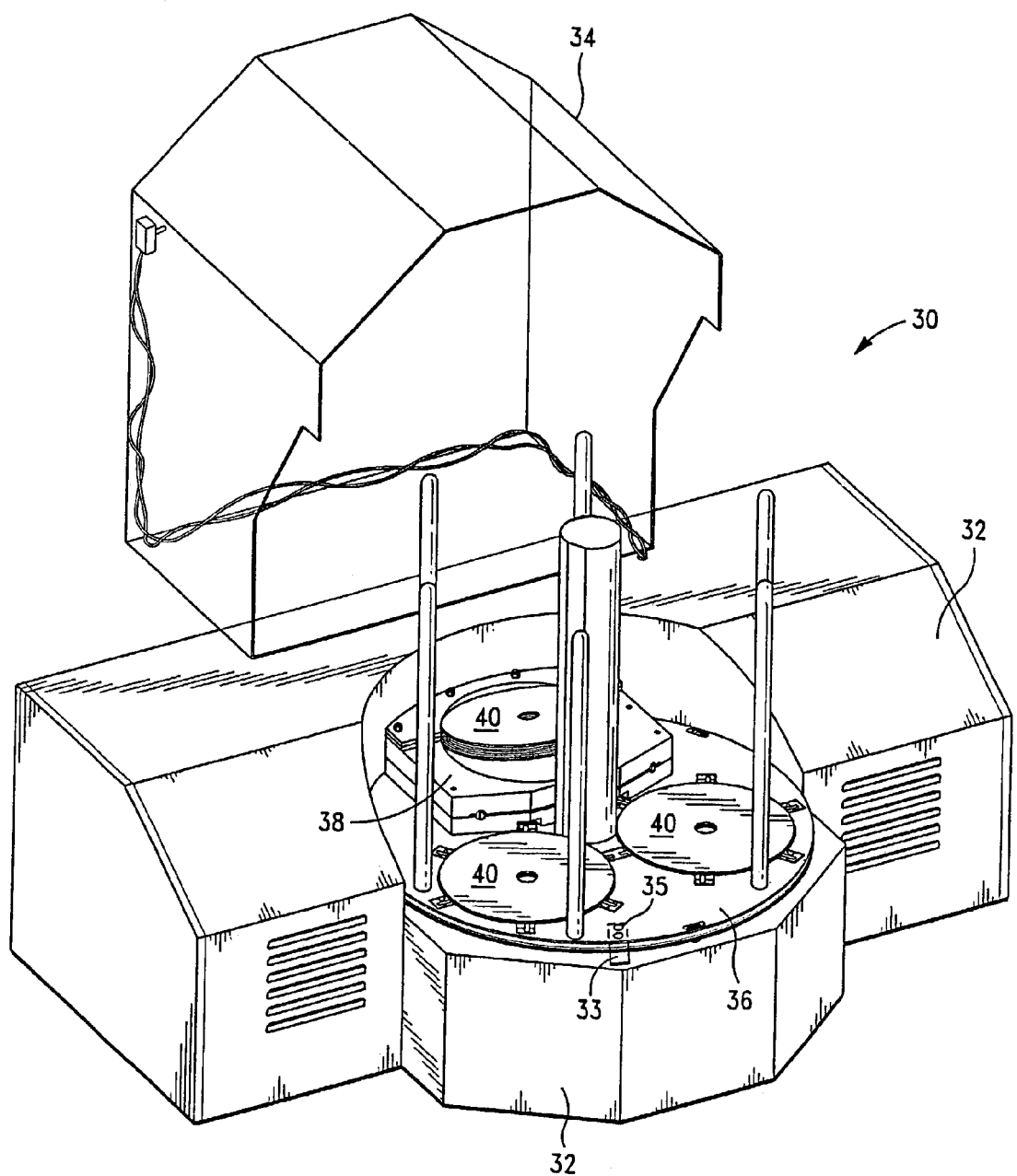
FIG. 1 is a perspective view of a disk duplication system in accordance with the present invention.

FIG. 1 shows a disk duplication system, generally designated with the reference numeral 30. The system 30 includes a housing 32 with a cover 34, a turntable 36, and a disk dispenser 38. The turntable 36 includes several hoppers for feeding and accepting memory storage disks 40. The turntable 36 rotates to move the disks 40 along an arcuate path. The system 30 includes a sensor 33 mounted on a portion of the housing 32, adjacent the turntable 36.

The housing 32 encloses a CD recorder for writing data on disks. The disk dispenser 38 dispenses disks 40 into the recorder. When data writing is complete, the turntable 36 rotates and accepts the written disk in a selected hopper. Further rotation of the turntable 36 enables the disk dispenser 38 to dispense another disk into the CD recorder, repeating the data writing process.

The turntable 36 includes embedded magnets 35. The sensor 33 detects the magnets 35 to enable the system to recognize when the turntable 36 is in a desired rotational position with respect to the housing 32.

The disk dispenser 38 of the present invention is useful in conjunction recording data on memory storage disks such as compact disks, and duplicating compact disks. It can be appreciated, however, that a variety of media including optical or magnetic memory storage media may be dispensed and duplicated in accordance with the present invention. According to one variation of the invention, the housing 32 encloses a CD printer for printing indicia on disk surfaces and the disk dispenser 38 dispenses disks to the CD printer.

Figure 2:
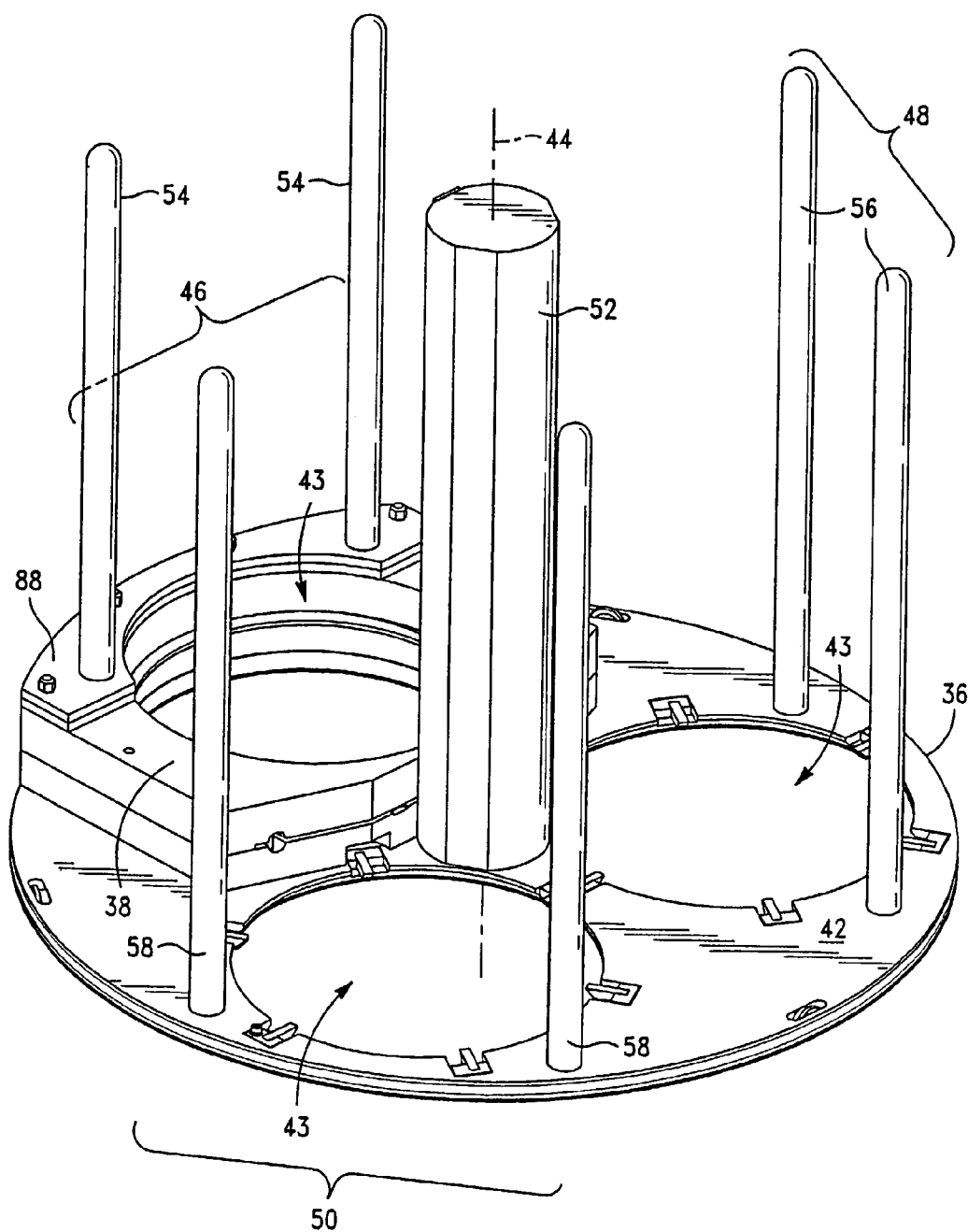
FIG. 2 is a perspective view of the turntable of FIG. 1.

FIG. 2 shows the turntable 36. The turntable 36 includes a central post 52, outer posts 54, 56 and 58, a surface 42 defining three openings 43. The turntable has an axis 44, a generally designated feed hopper 46, accept hopper 48, and reject hopper 50. The hoppers 46, 48 and 50 generally align adjacent a respective opening 43 to dispense or accept disks through each respective opening.

The disk dispenser 38 mounts on the turntable 36 adjacent one opening 43 to dispense disks through the turntable 36. The outer posts 54 cooperate with the central post 52 to define the hopper 46 which guides disks into the disk dispenser 38.

The central post 52 aligns with the turntable axis 44. The outer posts 54, 56 and 58 are positioned co-radially with respect to the turntable axis 44. The outer posts 56 and 58 cooperate with the central post 52 to surround the respective turntable openings 43 and to define the reject hopper 48 and accept hopper 50, respectively.

Although outer posts 54, 56 and 58 cooperate with the central post 52 to define the hoppers 46, 48 and 50 and provide a light weight structure to guide disks, one can appreciate that hoppers may assume any of a number of configurations. A cylindrical wall may define a hopper, for example. Also for example, a helical coil, or by another structure having a lightweight design could define the hopper.

Figure 3:
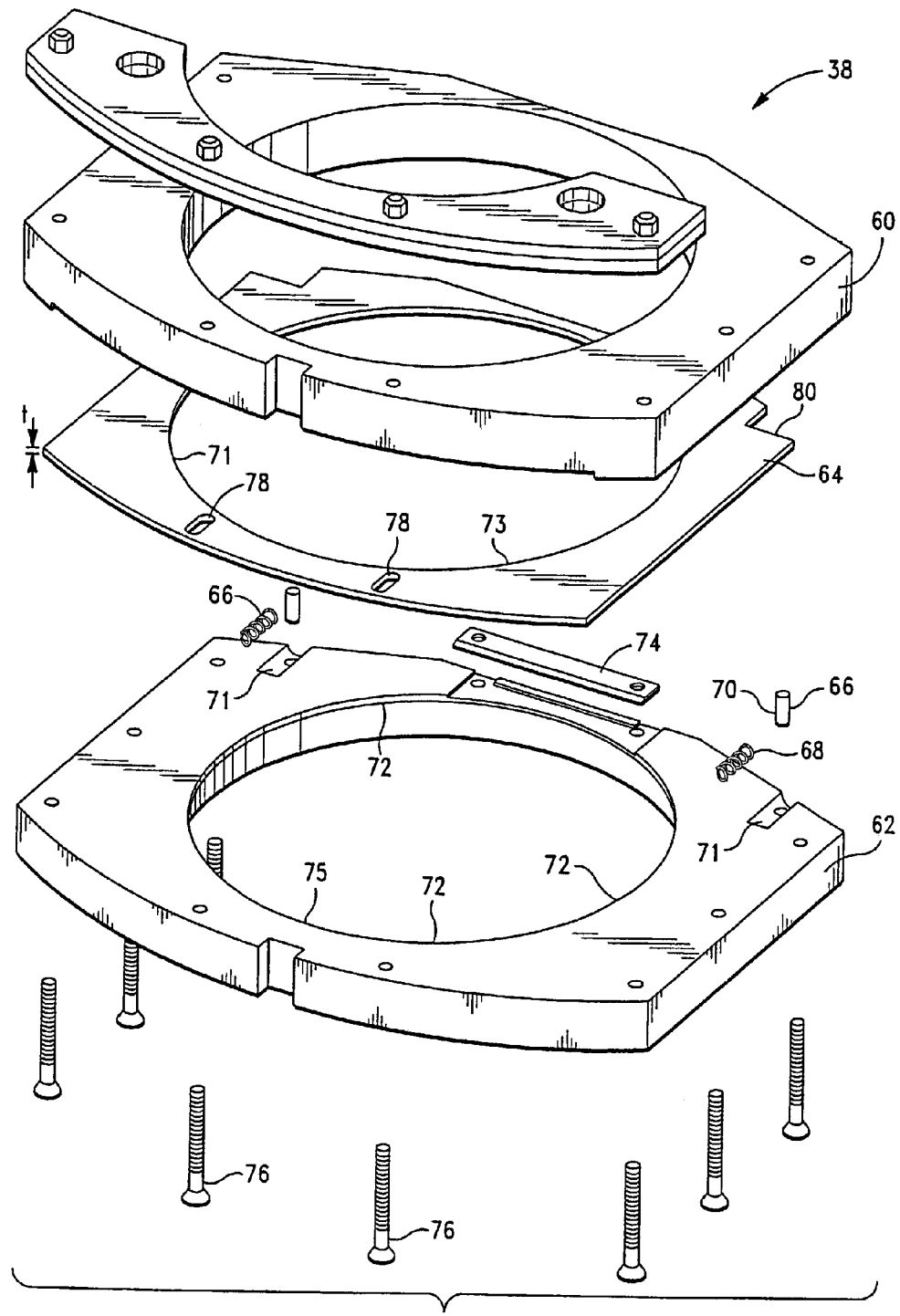
FIG. 3 is an exploded perspective view of the disk dispenser of FIG. 1.

FIG. 3 shows an exploded view of the disk dispenser, generally designated 38. The disk dispenser 38 includes an upper guide 60, a lower guide 62 and a plate 64. The lower guide 62 includes a spring 68, a rim 72, a support lip 74, an opposing edge 75, and fasteners 76. The plate 64 includes an arced edge 71. The arced edge 71 defines an inner periphery 73. The inner periphery 73 defines an opening for surrounding a disk. Preferably, the inner periphery 73 is circular for circumscribing a disk. The inner periphery 73 is configured with a beveled edge for separating single disks from a stack of disks.

The upper guide 60, the lower guide 62 and the plate 64 each define a generally circular opening to enable a disk to pass through the disk dispenser 38. Each opening is sized for a disk to pass through when the disk parallels the plate 64. The upper guide 60 and the lower guide 62 are axially offset from each other so that a portion of the rim 72 of lower guide 62 stops disks which may fall thorough the upper guide 60 towards the lower guide 62. The opposing edge 75 diametrically opposes the support lip 74. The support lip 74 cooperates with the opposing edge 75 to hold a disk on the lower guide 62. The plate 64 slidably mounts between the upper guide 60 and the lower guide 62 to selectively pass disks stopped by the lower guide 40 through the lower guide 62.

The pin 70 extends between the lower guide 62 and the upper guide 60 to retain the spring 68. The plate 64 includes a pair of holes 78, which align with respective fasteners 76. The fasteners 76 extend through the upper guide 60, the plate 64 and the lower guide 62 to hold the upper guide 60 and the lower guide 62 together. The fasteners 76 retain the plate 64 between the upper guide 60 and the lower guide 62. The fasteners 76 align the plate 64 relative to the upper guide 60 and the lower guide 62 when the plate 64 slides.

The lower guide 62 includes a groove 71. The spring 68 is a coil spring having two ends. The spring 68 lies in the groove 71. The pin 70 inserts perpendicularly into the groove 71. Accordingly, one end of the spring 68 contacts the pin 70. The spring 68 biases the plate 62 in a desired position. According to one aspect of the invention, the spring 68 offsets the plate 62 from the lower guide 62 to enable the lower guide 62 to support a disk.

The plate 64 has a shoulder with an edge 80. The edge 80 contacts the other end of the spring 68. The spring 68 biases the plate 64 into a desired position relative to the lower guide 62. When the plate 64 slides towards the pin 70, the spring 68 dampens movement of the plate 64. The plate 64 has a generally uniform thickness "t". The thickness "t" approximates the thickness of an individual disk to be dispensed so that when the plate 64 slides, only one disk is dispensed.

Figure 4:
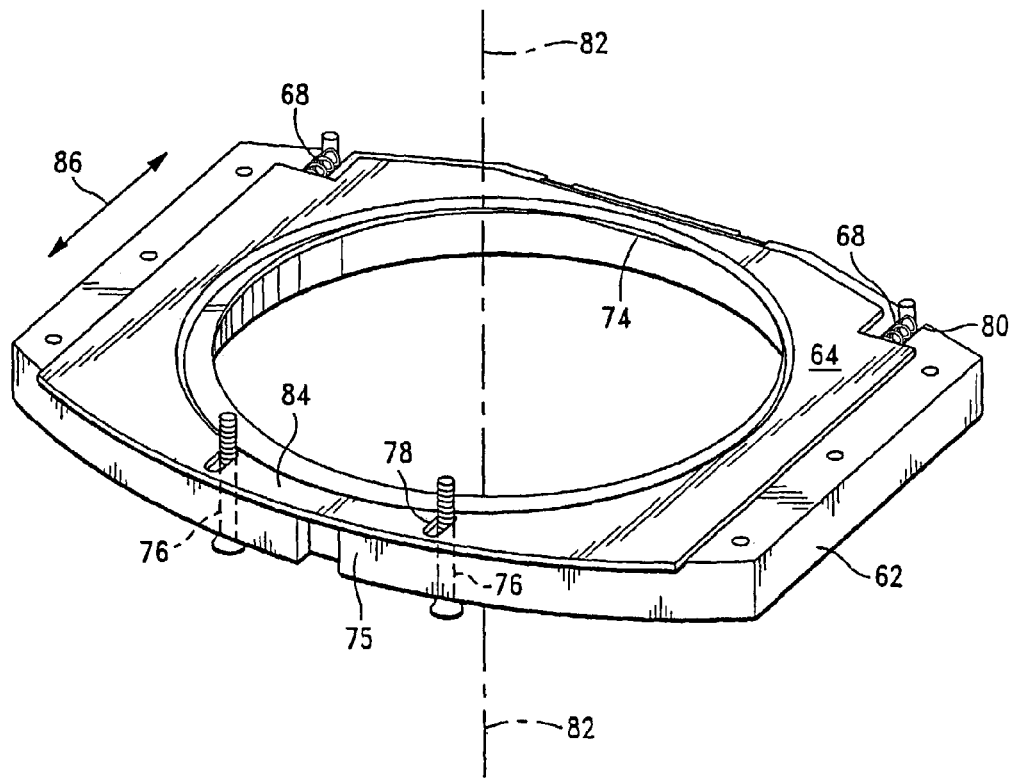
FIG. 4 is a perspective view of a portion of the dispenser of FIG. 3.

FIG. 4 is a perspective view of the plate 64 and the lower guide 62. The plate 64 reciprocates with respect to the lower guide in the directions of the arrows 86. The lower guide 62 opening defines an axis 82. The spring 68 biases the plate 64 so that the plate opening is axially offset from the lower guide opening. Offsetting the plate 64 opening from the lower guide 62 opening enables the support lip 74, in cooperation with the opposing edge 75, to hold a disk on the lower guide 62. The plate 64 circumscribes a disk when the disk is on the lower guide 62. The plate 64 slides towards the springs 68 to dispense a disk through the lower guide 62 opening. The springs 68 reciprocate the plate 64.

Figure 5:
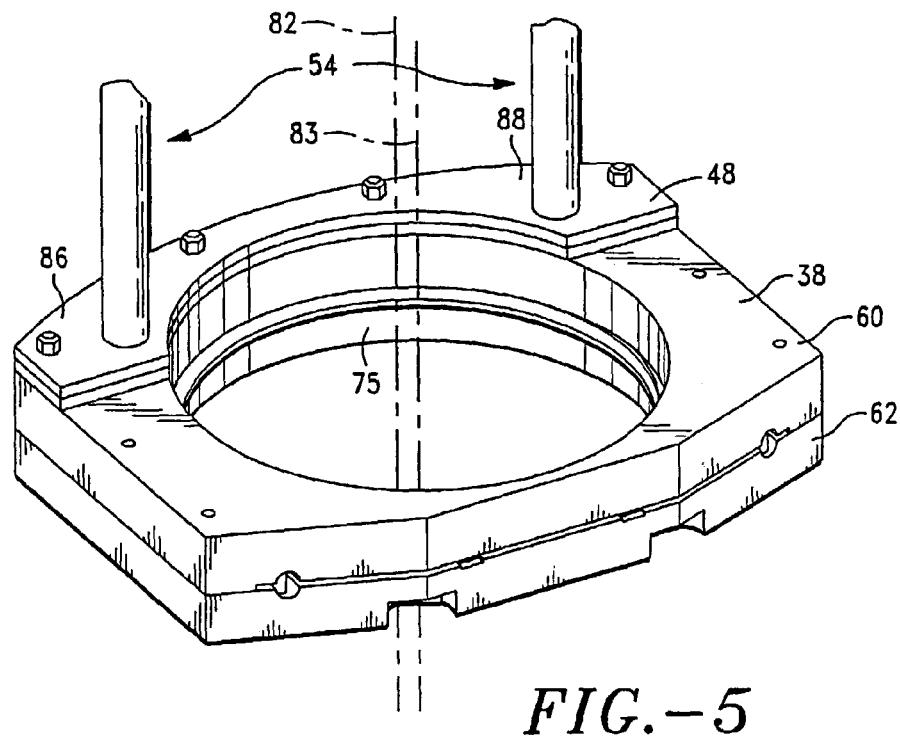
FIG. 5 is a perspective view of the disk dispenser of FIG. 3 and a portion of a feed hopper.

FIG. 5 is a perspective view of the disk dispenser 38 attached to the feed hopper 46. The feed hopper 46 is configured with a reinforcement plate 88, which bolts to the upper guide 60. The outer posts 54 mount on the reinforcement plate 88. Accordingly, the feed hopper attaches to the disk dispenser. The reinforcement plate 88 inhibits flexion of the disk dispenser 38 while supporting the feed hopper 46 (see FIG. 2).

The upper guide 60 has an opening with an axis 83. The axis 82 of the lower guide 62 opening is axially offset from the axis 83 of the upper guide 60 opening.

FIG. 6 shows a cutaway rear perspective view of the housing 32. The housing 32 includes a motor 100, a mechanical linkage 102, the elevator pin 98 and an arm 104. The arm 104 and the elevator pin 98 are connected via the mechanical linkage 102 to the motor 100. The motor 100 actuates the mechanical linkage 102 to cause the arm 104 to slide the plate 64 and to lift and lower the elevator pin 98. Movement of the linkage 102 and rotation of the turntable 36 dispense disks, one at a time, from the dispenser 38 onto the elevator pin 98. Movement of the linkage 102 may also insert disks, one at a time, through the opening 43 in the turntable 36 when the turntable 36 rotates.

According to one aspect of the invention, the elevator pin 98 is a single unit. According to another aspect of the invention, the elevator pin 98 has multiple components, which extend and retract.

Figure 7:
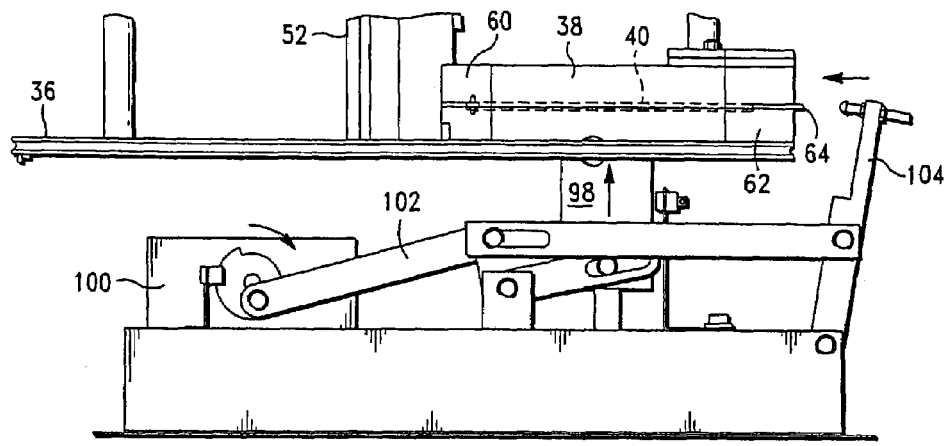
FIG. 7, FIG. 8, and FIG. 9 are side views, in sequence, of the elevator pin moving a disk from the turntable of FIG. 1.

FIG. 7 shows a side view of the disk dispenser 38, the turntable 36 and the linkage 102. The motor 100 actuates the linkage 102. The linkage 102 elevates the elevator pin 98 towards the turntable 36 and moves the arm 104. The arm 104 moves towards the plate 64 of the disk dispenser.

Figure 8:
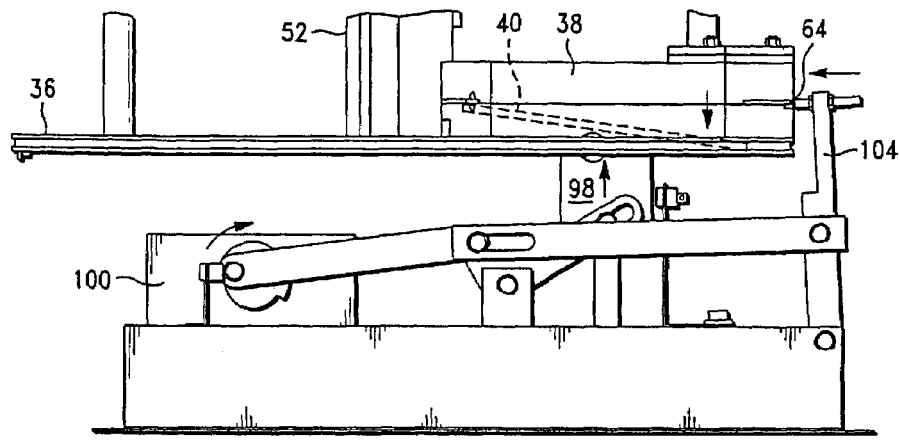

FIG. 8 shows further movement of the linkage 102. The arm 104 presses against the plate 64 to slide the plate 64. Sliding the plate 64 relative to the upper guide 60 and the lower 62 guide causes the dispenser 38 to drop the disk 40 onto the elevator pin 98.

Figure 9:
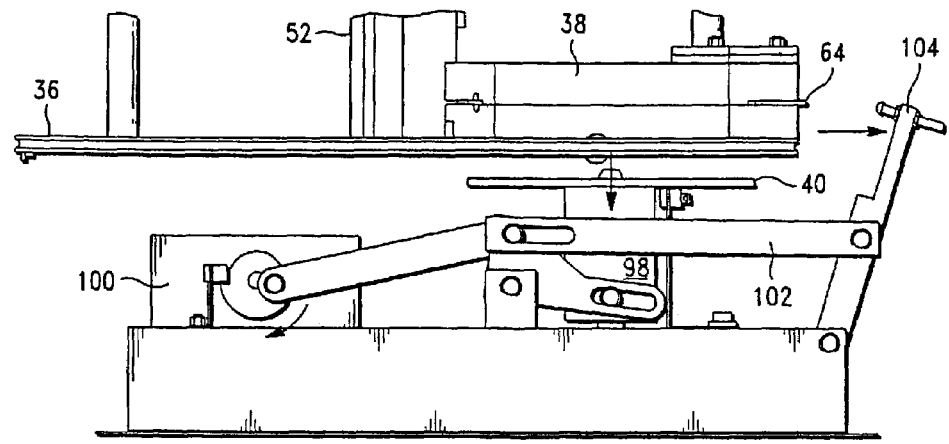

FIG. 9 shows further movement the linkage 102. The elevator pin 98 retracts from the dispenser 38. The arm 104 simultaneously withdraws from the dispenser 38. The elevator pin 98 lowers the dispensed disk 40 away from the dispenser 38.

A single elevator pin cycle is completed when the elevator pin 98 retracts and the arm 104 withdraws. At this point in the cycle, the turntable 36 rotates. Rotation of the turntable 36 enables a subsequent cycle of the elevator pin 98 to lift the disk 40 back onto the turntable 36, for example.

Figure 10:
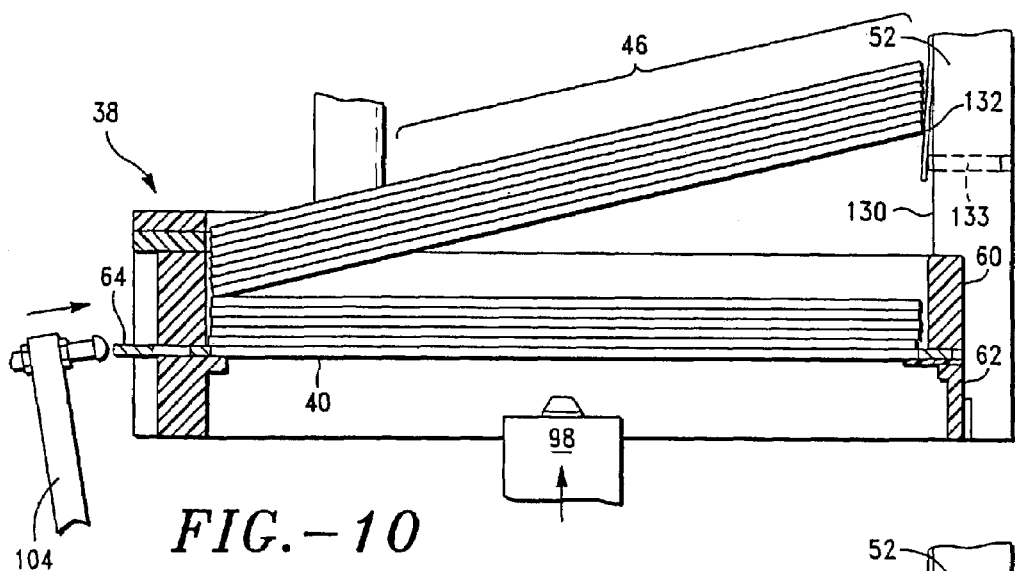

FIG. 10 shows the arm 104 moving towards the plate 64. The support lip 74 and the opposing edge 75 of the lower guide 62 support the disk 40. The elevator pin 98 moves towards the dispenser 38 and the arm 104 moves towards the plate 64. Preferably, the upper guide 60 holds from 4–6 disks in parallel with the plate. The three hoppers are each adapted to hold between 100–150 disks.

The central post 52 of the feed hopper 46 includes a recessed portion 130, an extended portion 132 and an adjustable set screw 133. The recessed portion 130 is adjacent the upper guide 60 to feed disks, in horizontal alignment with the plate 64, from the feed hopper 46 to the upper guide 60. The set screw 133 rotatably extends through the central post 52 to adjust the distance at which the extended portion 132 extends from the central post 52 and insures proper feeding of disks from the feed hopper 46 to the upper guide 60.

The extended portion 132 angles disks stacked in the feed hopper 46 with respect to the plate 64. Angling disks within the feed hopper 46 minimizes forces caused by disk weight on the disk dispenser 38, and particularly on the plate 64. Minimizing such forces enables multiple disks to be stacked in the feed hopper 46 and optimizes reliability of the disk dispenser.

Figure 11:
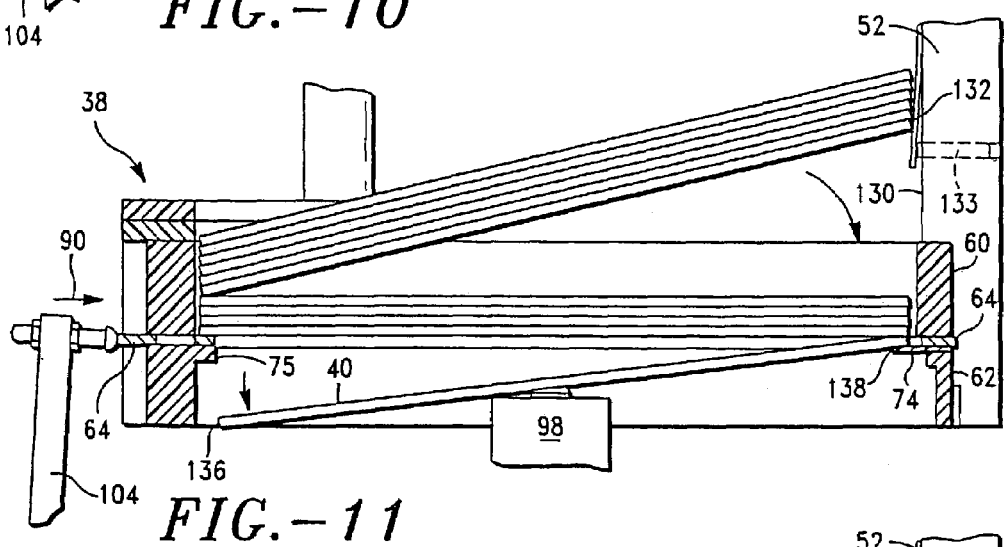

FIG. 11 shows the arm 104 contacting the plate 64. The disk 40 has two opposing edges 136 and 138. The arm 104 contacts the plate 64 to slide the plate 64 in the direction of the arrow 90. The plate 64 urges the edge 136 of the disk 40 off of the edge 75 of the lower guide 62. Reciprocation of the plate 64 urges the other edge 138 of the disk 40 off of the support lip 74 so that the disk 40 falls from the lower guide 60 onto the elevator pin 98.

Figure 12:
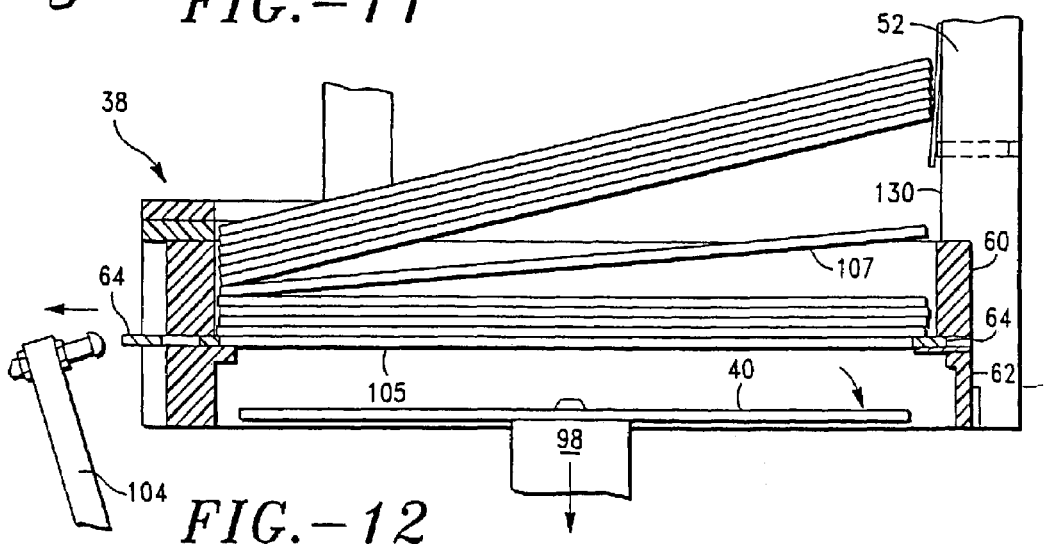

FIG. 12 shows the arm 104 withdrawn from the plate 64. The plate 64 automatically reciprocates as the arm 104 withdraws. The plate 64 guides the next disk 105 onto the lower guide 62. Movement of the next disk 105 onto the lower guide 62 causes another disk 107 to fall from the hopper into the upper guide 60.

Figure 13:
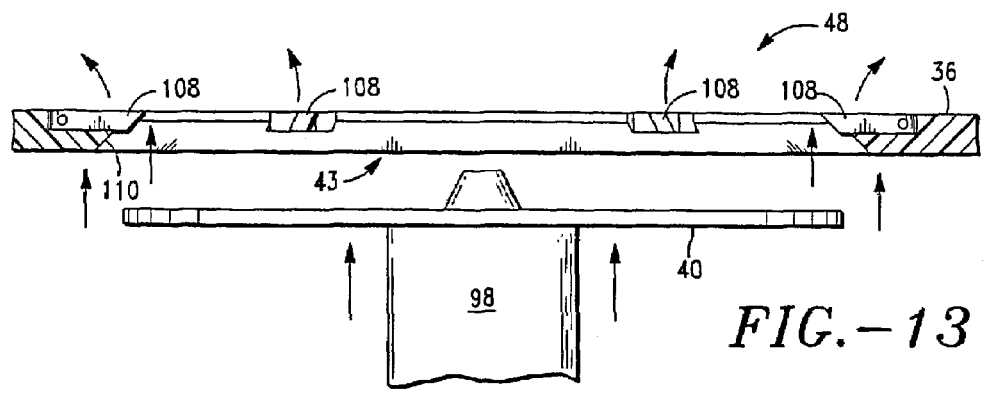
FIG. 13, FIG. 14 and FIG. 15 show a cross-sectional side view of the elevator pin lifting a disk.

FIG. 13 shows the elevator pin 98 extending to lift the disk 40 towards the turntable 36 from below the opening 43 of the accept hopper 48. The turntable defines the opening 43 to enables disks to pass into the accept hopper from beneath the turntable 36. The turntable 43 includes a periphery 110 surrounding the opening 43. A plurality of disk clips 108 mount on the periphery 110. The disk clips 108 function to allow the disk 40 to move through the turntable 36 into the accept hopper in only one direction, in the direction of the arrow 106.

Figure 14:
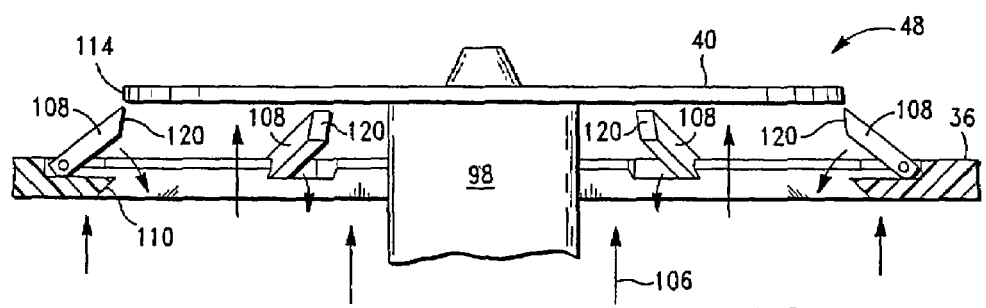

FIG. 14 shows the elevator pin 98 lift the disk 40 in the direction of the arrows 106 above the turntable 36. The elevator pin 98 passes through the turntable 36 with the disk 40. The disk 40 lifts the disk clips 108 as the disk 40 passes through the turntable 36. The disk 40 has an outer edge 114. The disk clips have ends 120. As the elevator pin 98 passes through the turntable, the outer edge 114 of the disk contacts the ends 120 of the disk clips 108.

The ends 120 of the disk clips 108 are angled to contact primarily the outer edge 114 of the disk 40. The angled ends 120 align the disk 40 in parallel with the turntable 36 as the disk passes through the turntable 36. This alignment insures that the disk 40 will not flutter on the elevator pin 98 when the elevator pin 98 extends to lift the disk 40 through the turntable 36. The elevator pin 98 retracts to place the disk 40 on to the disk clips 108.

Figure 15:
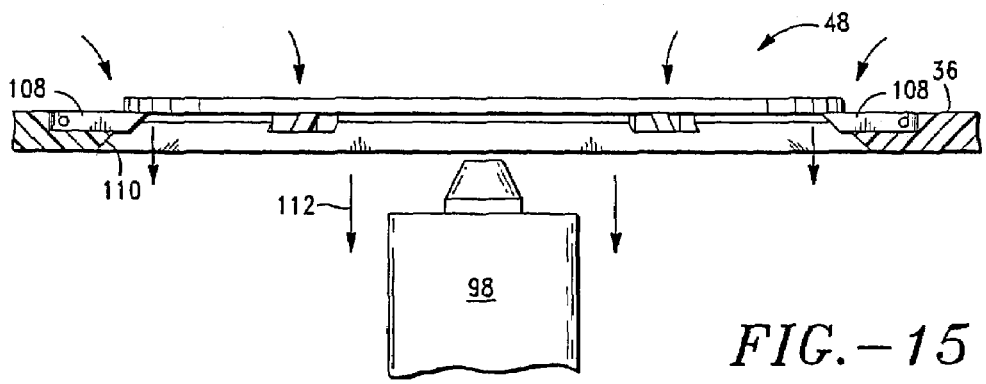

FIG. 15 shows the elevator pin 98 reciprocating in the direction of the arrows 112. The disk clips 108 extend radially towards the center of the opening 110. The elevator pin drops the disk 40 on the disk clips 108 so that the disk clips support the outer edge 114 of the disk 40. The disk clips 108 align with the turntable 36 to support the disk 40 on the turntable 36. The disk clips 108 are configured, having strength enough to support a stack of disks.

Repeating the process shown in FIG. 13, FIG. 14 and FIG. 15 that elevator pin stacks multiple disks on the disk clips 108 via the turntable opening 110 from beneath the turntable 36. To enable the disk clips 108 support a stack of disks, the elevator pin 98 is strong enough to lift the stack of disks supported when the elevator pin 98 lifts a disk through the turntable 36.

Figure 16:
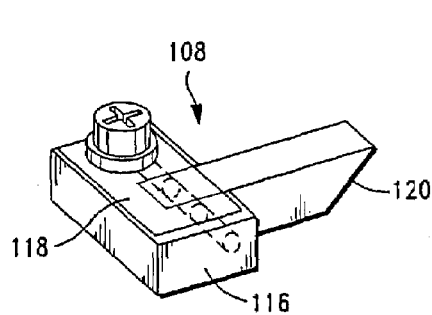
FIG. 16 and FIG. 17 show a disk clip in accordance with FIG. 15 and FIG. 14, respectively.

FIG. 16 shows a disk clip 108. The disk clip 108 includes a hinge 116, a spring 118 and the angled end 120. The spring 118 includes a strip of resilient material, which covers a portion of the disk clip 108 to bias the disk clip 108 in the configuration shown.

Figure 17:
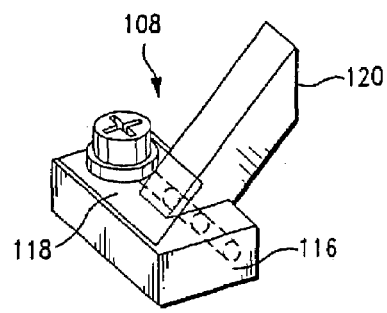

FIG. 17 shows the disk clip 108 rotated about the hinge 116. The disk clip 108 extends at an angle with respect to the hinge 116. The spring 118 flexes and the beveled edge 120 aligns perpendicularly to the hinge 116 and to the turntable surface, see FIG. 13.

Figure 18:
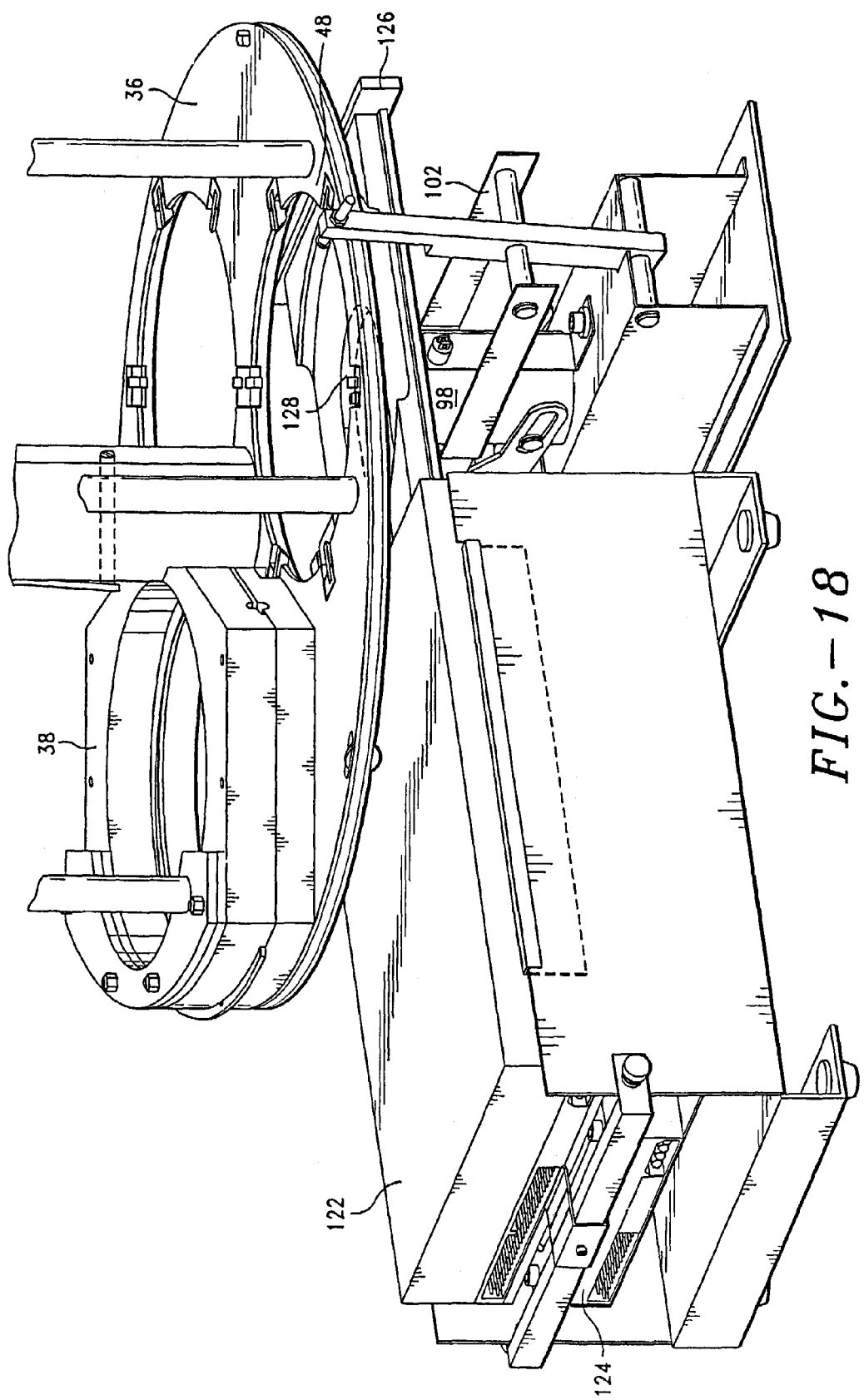
FIG. 18 is a perspective view of a disk recorder positioned in an operative arrangement with respect to the turntable and linkage mechanism in accordance with the present invention.

FIG. 18 shows the turntable 36, a recorder 122, a hard drive 124, the elevator pin 98, and the mechanical linkage 102. The recorder 122 includes a tray 126. The tray 126 automatically extends from the recorder 122 to interpose a disk between the elevator pin 98 and the turntable 36, or to catch a disk, which is dispensed from the disk dispenser 38.

The tray 126 includes an opening 128 to enable the elevator pin 98 to extend through the turntable 36, via the tray 126. The hard drive 124 couples with the recorder 122 to deliver data to be written. A controller including a circuit board within the housing regulates operation of the hard drive 124, the recorder 122, the linkage 102 and the turntable 36.

According to one aspect of the invention, the recorder 122 is a Compact Disk Recorder, a DVD recorder, or the like. Preferably, the housing 32 of FIG. 1 encloses the recorder 122, the hard drive 124, the pin 98 and the linkage 102. The recorder 122 in combination with the disk dispenser 38, turntable 36 and the elevator pin 98 enables duplication of memory storage disks.

Figure 19:
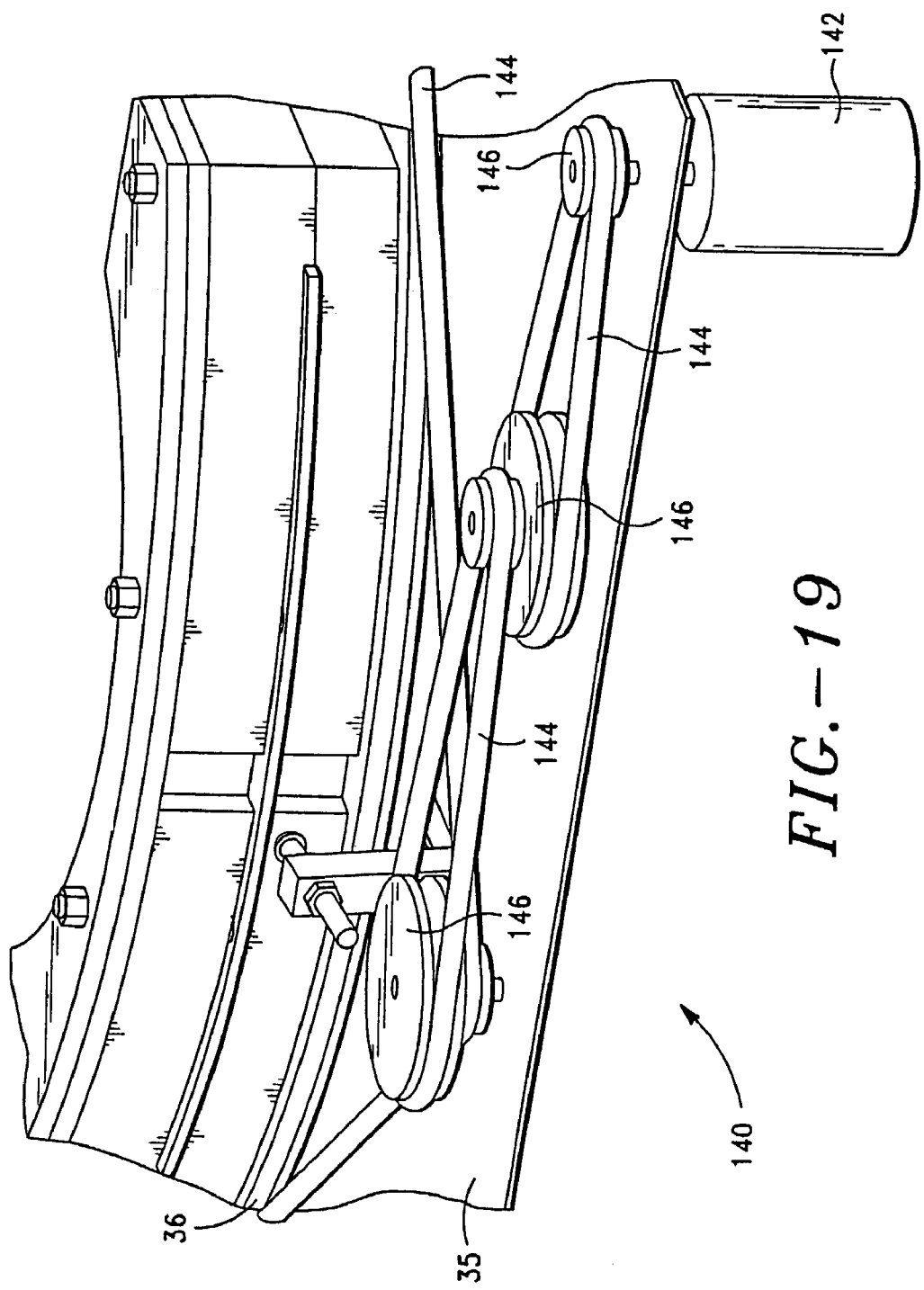
FIG. 19 is a perspective view of the drive linkage for the turntable of FIG. 1.

FIG. 19 is a perspective view of a portion of the linkage assembly, generally designated 140, which rotates the turntable 36 in accordance with the present invention. The drive linkage assembly 140 mounts on a portion of the housing 32. The assembly 140 includes a motor 142, belts 144, and pulleys 146. The belts 144 and pulleys 146 operate to selectively rotate the turntable 36 at a desired rate.

Figure 20:
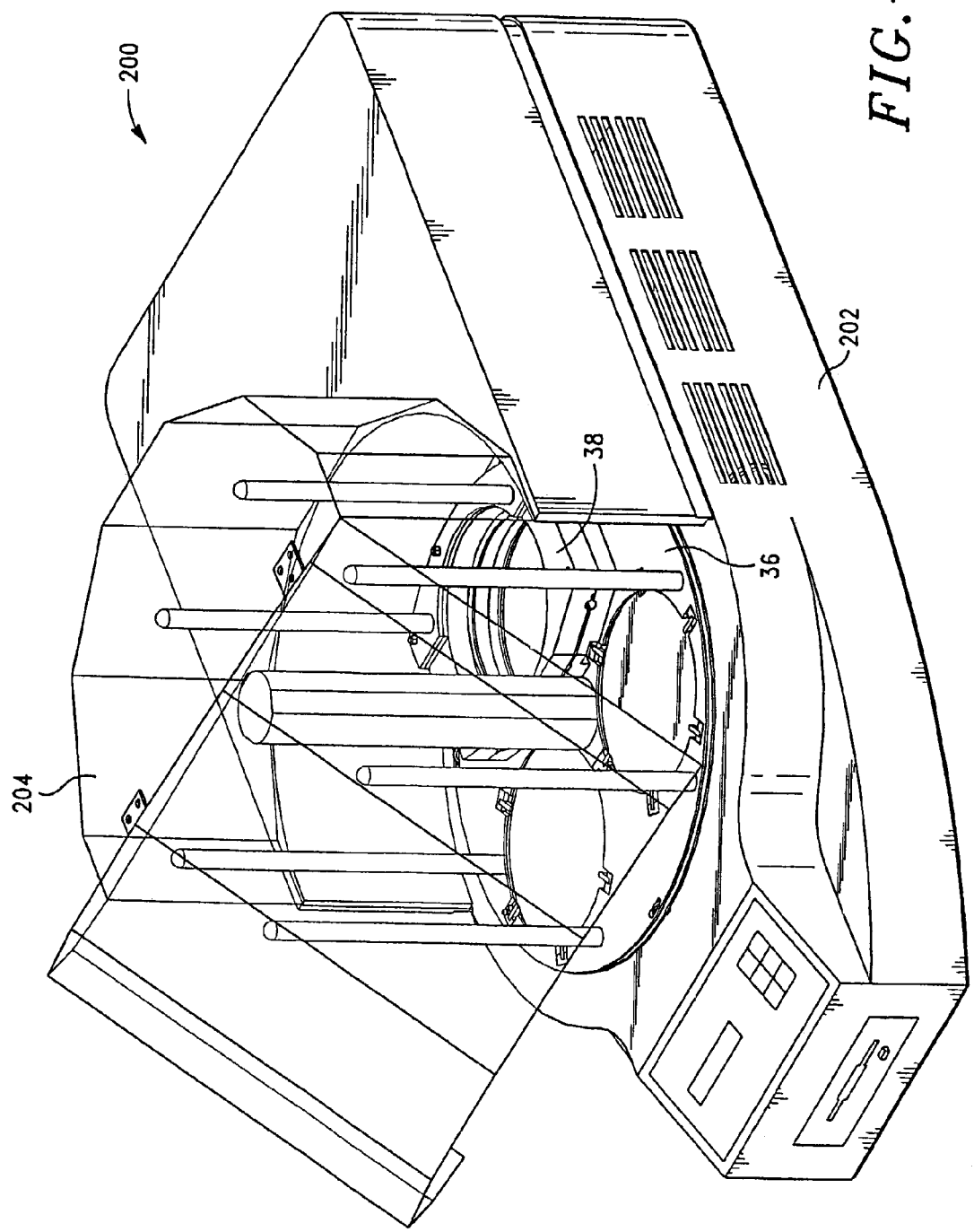
FIG. 20 is a perspective view of a disk recorder in combination with a disk printer.

FIG. 20 shows a disk duplicating and printing apparatus 200. The apparatus 200 includes a housing 202, which encloses a disk recorder and a disk printer. The apparatus 200 includes a turntable 36 having a disk dispenser 38, and a transparent cover 204.

The transparent cover 204 is split and includes hinges 206 to enable the cover 204 to open and close without requiring removal of the cover from the housing. The cover 204 is transparent to enable inspection of the disk duplicating and printing apparatus 200 during operation.

While the turntable and disk dispenser are shown in conjunction with a recorder and a printer, it can be appreciated that the turntable and dispenser can be used in any of a number of operations which are performed on memory storage disks, including cleaning, polishing, re-recording, packaging, and reading, etc.

Figure 21:
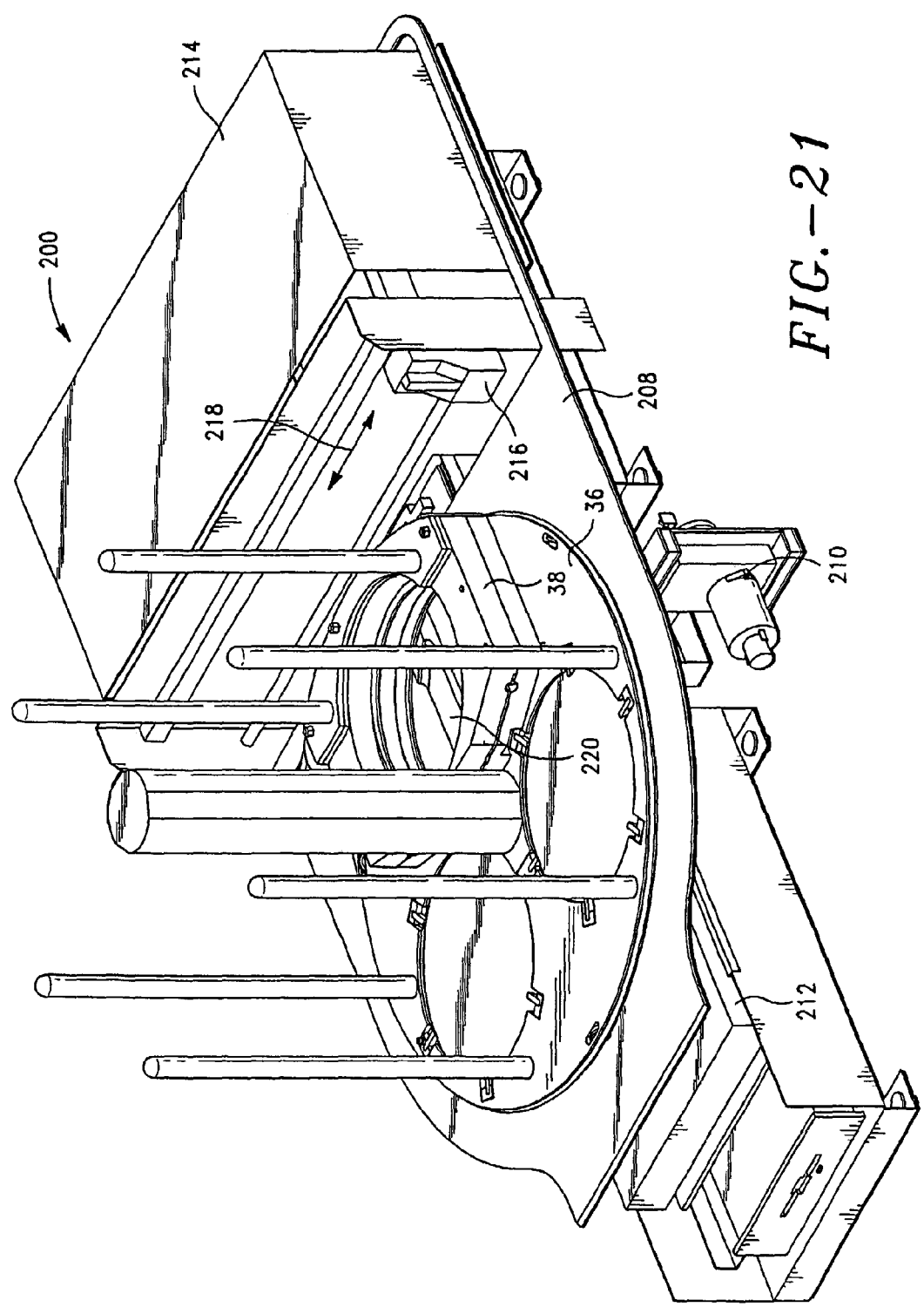
FIG. 21 is a perspective view of the combination of FIG. 20 without a cover.

FIG. 21 shows the apparatus 200 having a frame 208, a motor 210, a disk recorder 212 and a disk printer 214. The disk recorder 212, disk printer 214 and motor 210 mount on the frame 208. The motor 210 rotates the turntable 36 to move disks between the turntable 36, the disk recorder 212 and the disk printer 214. The motor 210 also actuates the disk dispenser 38. The printer 214 has a tray 220, which extends and retracts. The printer 214 includes an ink jet cartridge 216, which reciprocates in the direction of the arrows 218 to enable the printer 214 to write on disk surfaces. According to one aspect of the invention, the printer 218 is a SIGNATURE® printer and the ink jet cartridge 216 reciprocates across a disk to print on the disk surface as the tray 220 extends.

Figure 22:
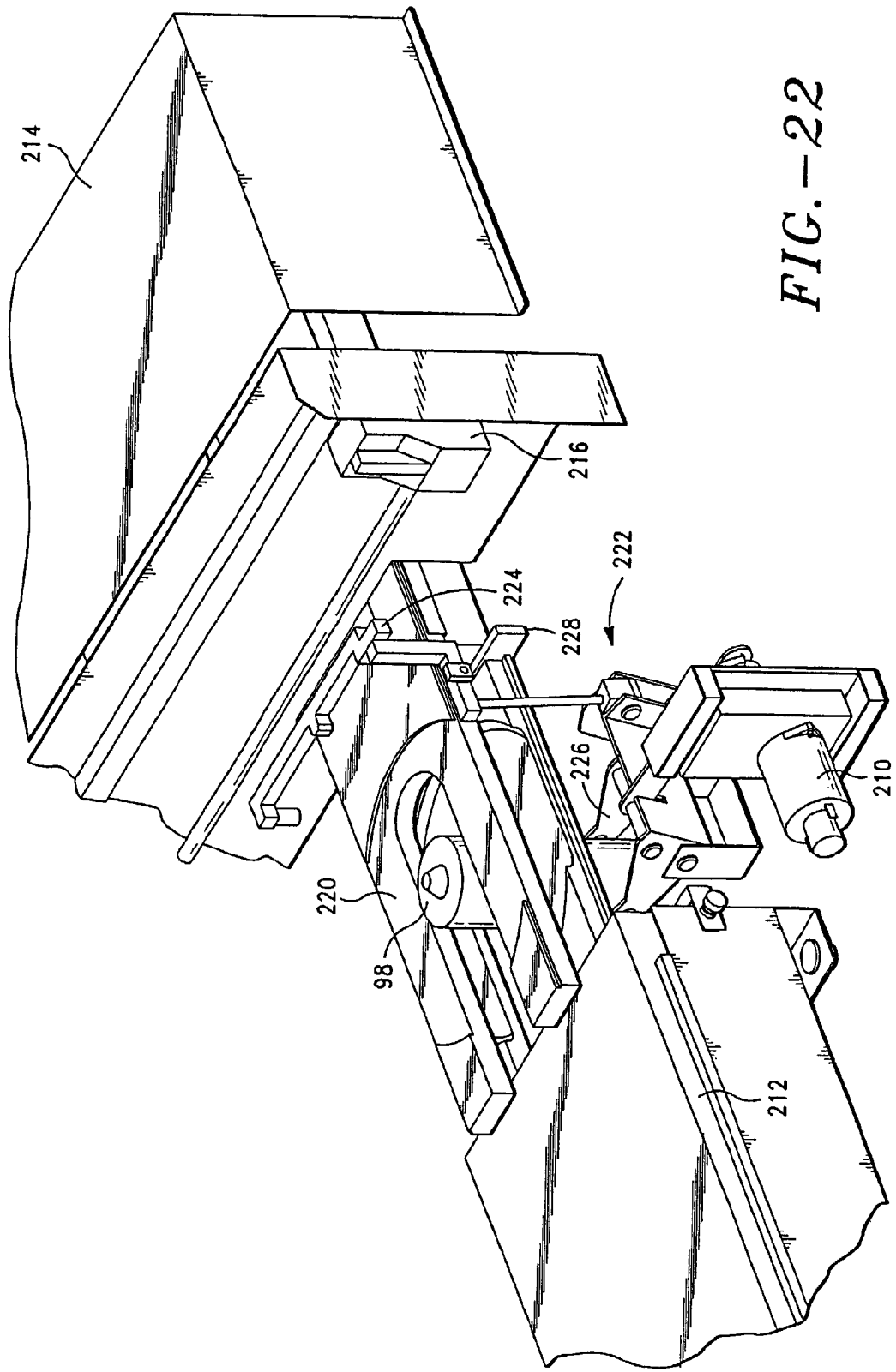
FIG. 22 is a perspective view of the writer tray, the printer tray and the elevator pin in accordance with the invention of FIG. 20.

FIG. 22 shows the printer 214, the recorder 212, the motor 210 and an elevator pin linkage 222. The elevator pin linkage assembly 222. The elevator pin linkage assembly 222 includes a disk dispenser actuator 224 and an elevator pin actuator 226. Accordingly, the elevator pin linkage assembly 222 coordinates the elevator pin 98 and the disk dispenser actuator 224.

The elevator pin 98 extends and retracts. The recorder 212 includes a tray 228. The tray 228 includes a central opening to allow the elevator pin to extend through. A portion of the tray 220 is bifurcated to form a U shaped opening. Bifurcation of at least a portion the tray 220 enables the tray 220 to extend and retract when the elevator pin 98 extends. Accordingly, the tray 220 can extend or retract independently of the relative position of the elevator pin 98.

The tray 220 of the printer 214 and the tray 228 of the recorder 212 oppose each other. This is not the only possible configuration. Conceivably, the recorder trays and printer trays can radially align, or stack above an appropriately configured elevator pin in accordance with the present invention.

Figure 23:
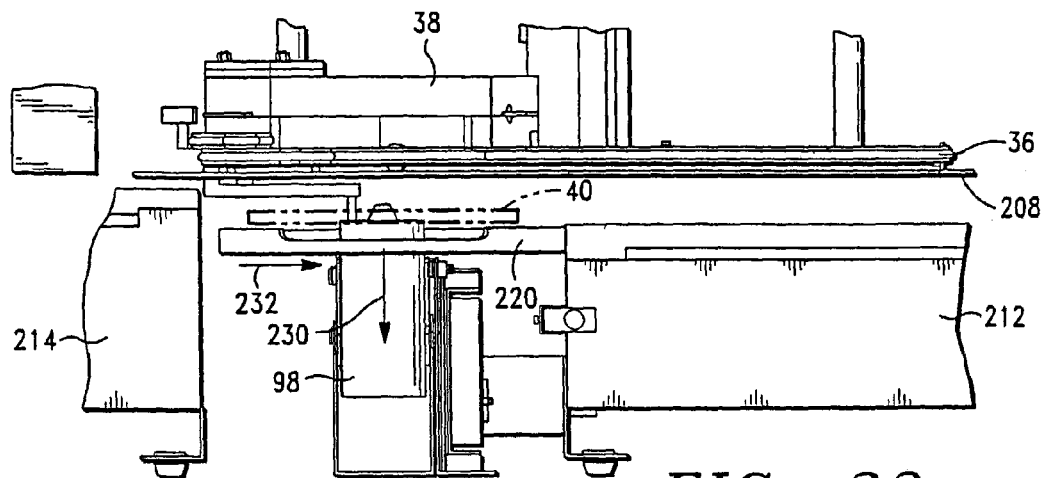
FIG. 23, FIG. 24, FIG. 25, FIG. 26, FIG. 27 and FIG. 28 show a sequence of movement of the writer tray and printer tray of FIG. 22 in accordance with the present invention.

FIG. 23 shows the turntable 36 mounted on the frame 208. The recorder 212, the printer 214, and the elevator pin 98 mount adjacent the turntable 36. The recorder tray 220 extends fully. The elevator pin 98 extends through the recorder tray 220, towards the turntable 36. The disk dispenser 38 dispenses a disk 40 onto the elevator pin 98. The elevator pin 98 retracts in the direction of the arrow 230 to lowers the disk 40 onto the recorder tray 220 and continues to retract to free the recorder tray 220 from interference with the elevator pin 98 to enable the recorder tray 220 to retract. After the disk 40 is on the recorder tray 220, and the elevator 98 pin retracts, the recorder tray 220 retracts into the recorder 212 in the direction of the arrow 232 to record data on the disk 40. After data is recorded on the disk 40, the recorder tray 220 extends.

Figure 24:
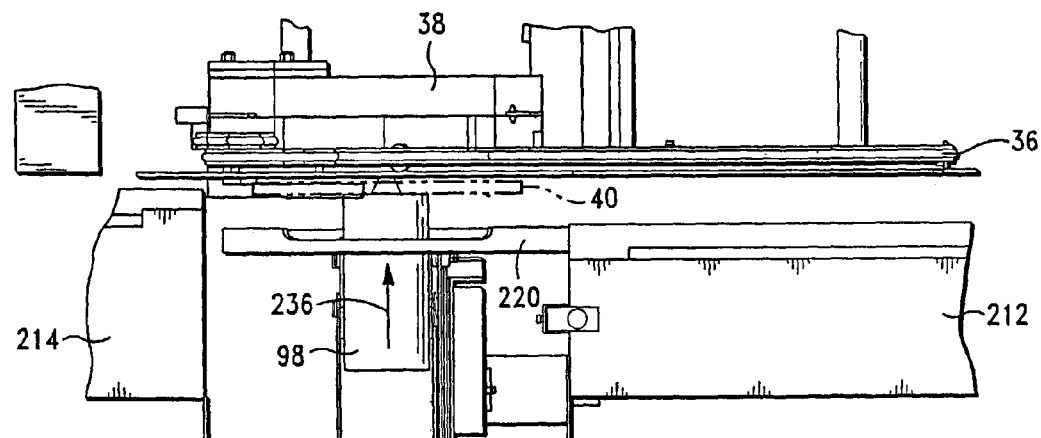

FIG. 24 shows the recorder tray 220 extended after the recorder 212 completes disk recording. The elevator pin 98 extends through the tray 220, lifting the disk 40 from the tray 220, towards the turntable 36 in the direction of the arrow 236. The next step is to print indicia on the disk 40.

Figure 25:
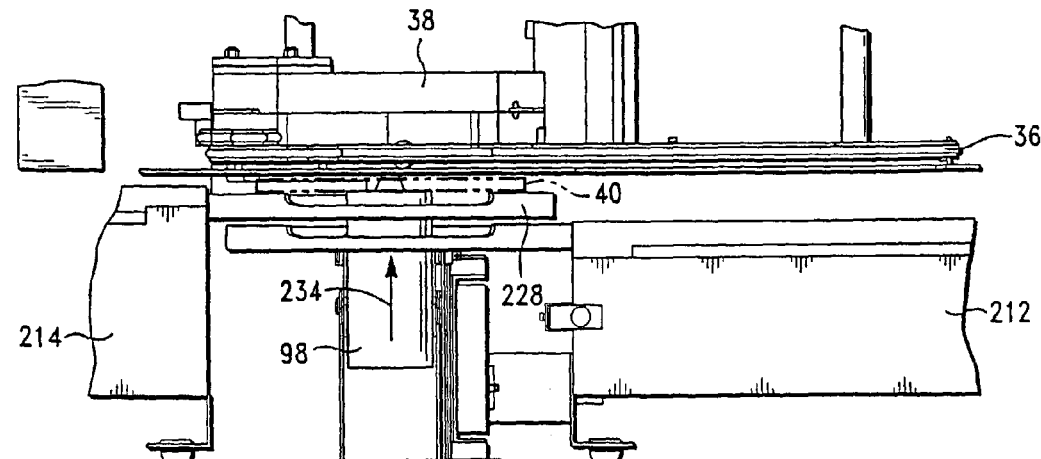

FIG. 25 shows the printer tray 228 extending. Because the printer tray 228 is bifurcated, having a U shaped opening, the printer tray 228 moves past the elevator pin 98 to adjacent the disk. The elevator pin 98 lowers the disk 40 onto the printer tray 228 in the direction of the arrow 234.

Figure 26:
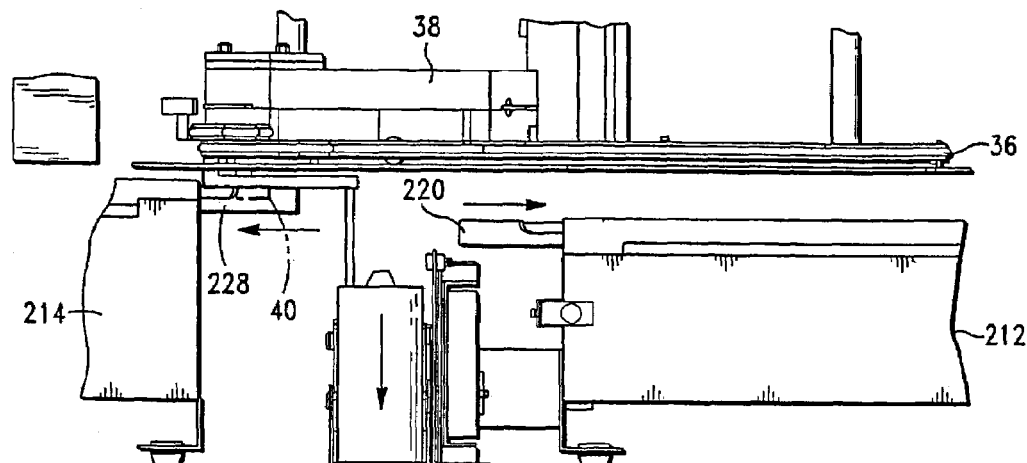

FIG. 26 shows the printer tray retracting. According to one aspect of the invention, the printer 214 prints on the disk 40 while the printer tray 228 retracts. According to another aspect of the invention, the printer 214 prints on the disk 40 when the printer tray 228 extends. According to either aspect, the printer tray 228 fully re-extends upon completion of printing.

Figure 27:
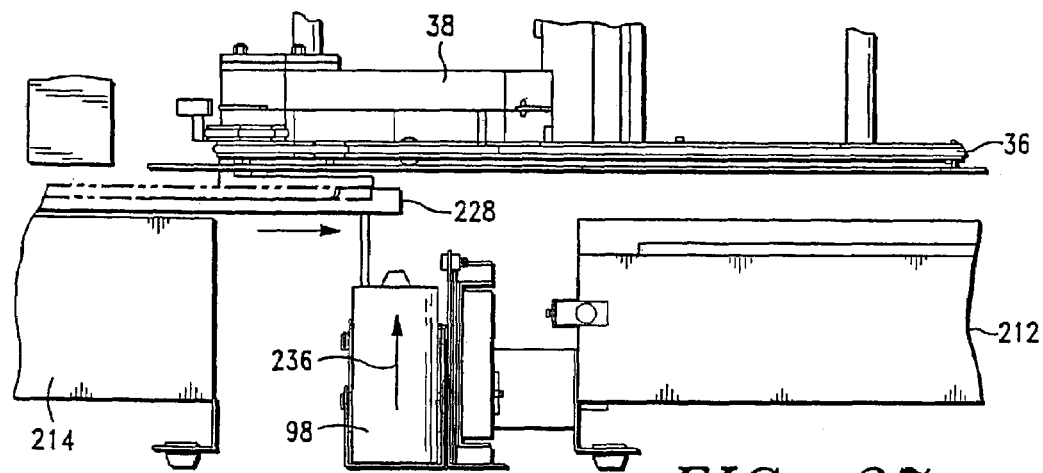

FIG. 27 shows the printer tray 228 extending towards a fully extended position. As the printer tray 228 extends, the turntable 36 rotates and the elevator pin 98 extends towards the turntable 36 in the direction of the arrow 236.

Figure 28:
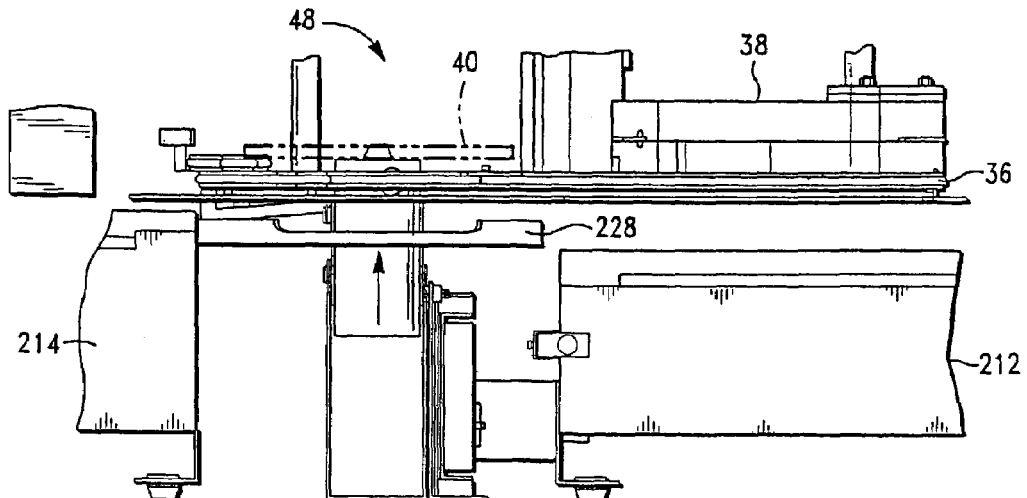

FIG. 28 shows the turntable 36 rotated to position the accept hopper 48 adjacent the elevator pin 98. The elevator pin 98 lifts the printed disk 40 from the printer tray 228. The elevator pin 98 lifts the printed disk 40 fully onto the turntable 36 into the accept hopper 48.

The turntable 36 rotates to position the disk dispenser 38 above the elevator pin 98, another disk 40 is dispensed, and the elevator pin 98 lowers the newly dispensed disk to the recorder 212 to repeat the sequence shown in FIG. 23–FIG. 28, inclusively.

Figure 29:
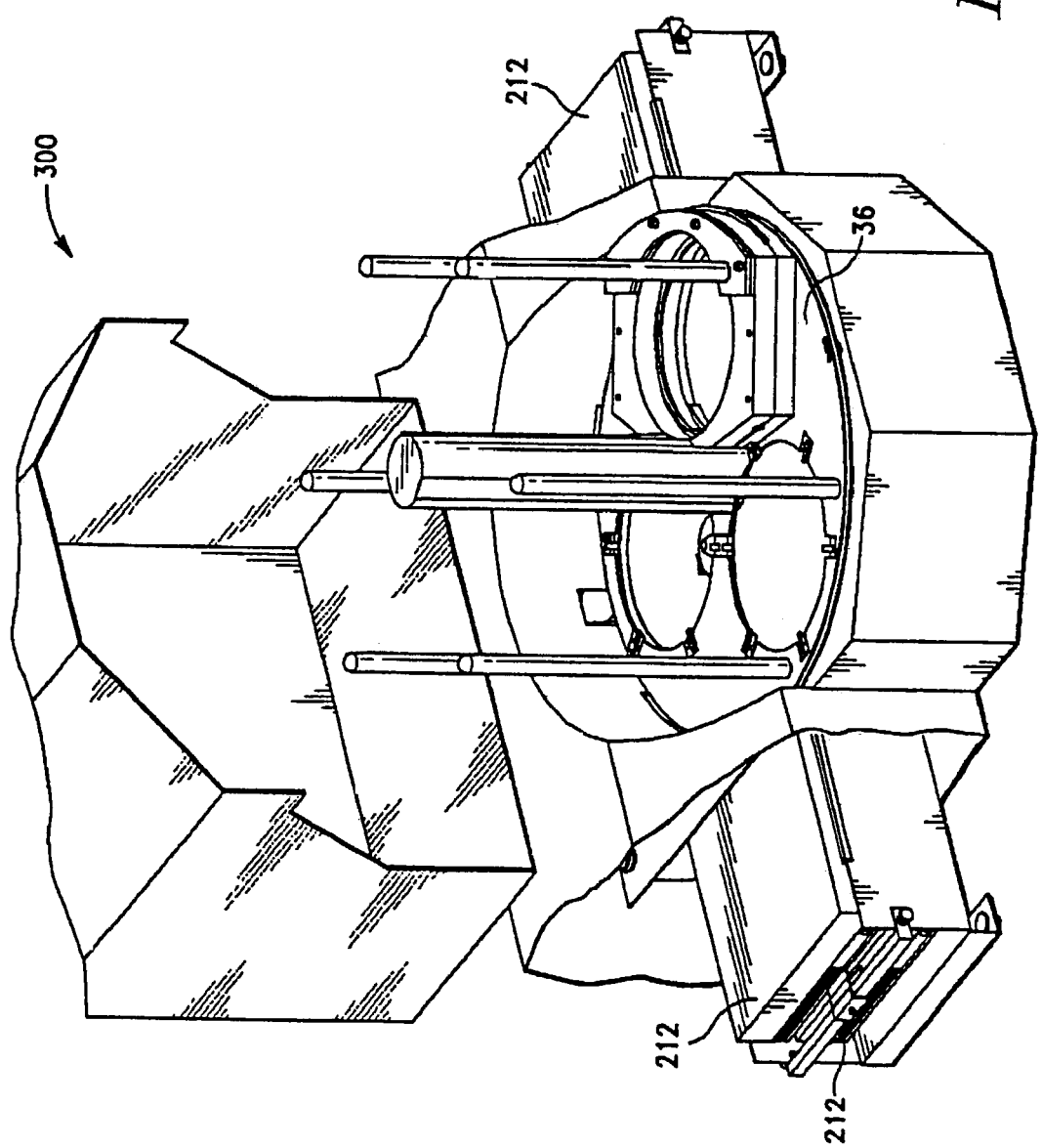
FIG. 29 shows a partially cutaway perspective view of disk duplication system having multiple recorders in accordance with the present invention.

FIG. 29 shows a disk handling system, generally designated with the reference numeral 300. The disk handling system includes a turntable 36 and multiple disk recorders 212. The system 300 connects to a computer network, or to a stand-alone computer via a standard connection such as a network card and cable, or a serial cable, respectively. Accordingly, data, which is to be duplicated, is communicated to the disk handling system. The multiple disk recorders 212 simultaneously write the data to disks held in the disk recorders 212. When the data is written, the disk handling system 300 sequentially removes the disks from the disk recorders and places the disks on the turntable. This sequence repeats.

It can be appreciated that the disk recorders 212 are but one example of a workstation type, which can be used in accordance with the present invention. For example, the disk recorders 212 may be replaced with disk printers, disk cleaners, disk surface testing devices and other useful devices in accordance with the present invention.

Figure 30:
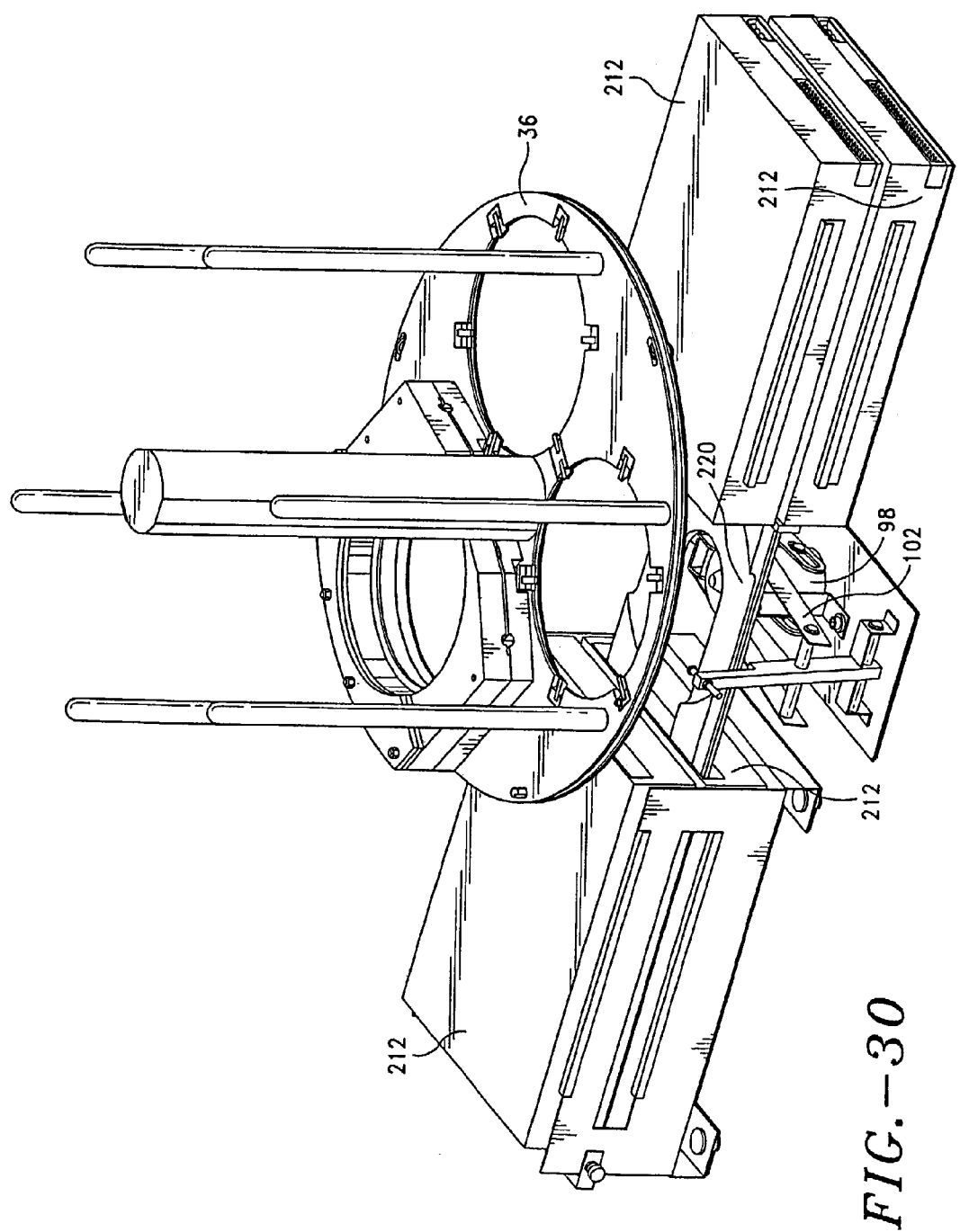
FIG. 30 shows a perspective view of the turntable and multiple recorders of FIG. 29, stacked and aligned in accordance with the present invention.

FIG. 30 shows the disk recorders 212, the turntable 36, the mechanical linkage 102 and the elevator pin 98. The disk recorders 212 are stacked in two discrete stacks. The two stacks oppose each other. The elevator pin 98 is interposed between the opposing stacks.

Figure 31:
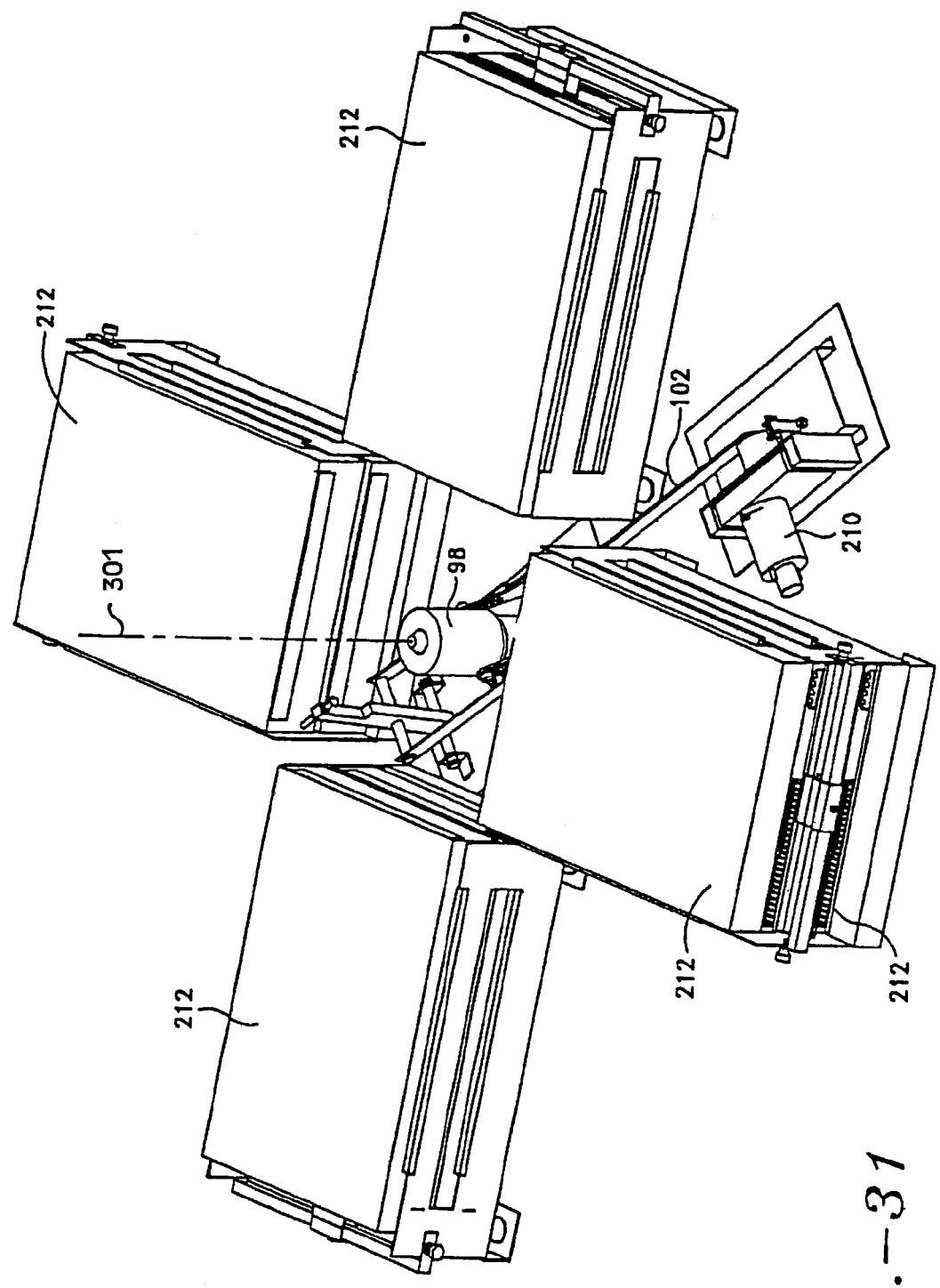
FIG. 31 shows a perspective view of the turntable and multiple recorders stacked and aligned in a radial array in accordance with the present invention.

FIG. 31 shows a variation of the invention, wherein the elevator pin 98 defines a central axis 301, the disk recorders 212 stack in a radial array with respect to the central axis 301. The mechanical linkage 102 and elevator pin 98 are interposed centrally between the recorders 212. The elevator pin 98 telescopes to lift disks, at varying heights, from each of the stacked disk recorders 212.

Although the elevator pin 98 aligns with the central axis 301, it can be appreciated that depending on relative position of the disk recorders 212 and the turntable, the elevator pin 98 may be positioned adjacent any of the disk recorders 212. According to another variation, multiple elevator pins 98 may be used. In accordance with the present invention, the elevator pin 98 may be laterally moveable to lift disks from any of the disk recorders 212. Alternatively, the recorders 212 may be moveable, laterally for example, to enable the elevator pin 98 to lift disks from the recorders 212.

FIG. 32 shows the elevator pin 98 in a retracted configuration. The elevator pin 98 includes multiple sleeves. The sleeves include a fixed sleeve 302, an intermediate sleeve 304, a spring member 306, an alignment pin 308, and a working sleeve 310. The intermediate sleeve 304 aligns the working sleeve 310 with the fixed sleeve 302 when the elevator pin 98 telescopes.

The cylindrical sleeves coaxially align and slide with respect to each other to enable the elevator pin 98 to telescope from a retracted configuration to an extended configuration. The spring member 306 contacts least one sleeve and wraps helically around the alignment pin 308 to bias the sleeves apart. The intermediate sleeve 304 slidably retains the alignment pin 308.

The fixed sleeve 302 is affixed to the housing and has an outside diameter, which is relatively smaller than the working sleeve 310 outside diameter. The working sleeve 310 includes fasteners 312. The fasteners 312 attach to the mechanical linkage 102 (FIG. 31) to enable the mechanical linkage 102 to actuate the elevator pin 98.

FIG. 33 shows the elevator pin of FIG. 32 in an extended configuration. The spring member 306 includes a helical spring with two ends. The helical spring is in coaxial alignment within the working sleeve 310. One end pushes against the working sleeve 310. The other end pushes against the intermediate sleeve 304. The spring member 306 functions to sequence movement of the working sleeve 310 relative to the intermediate sleeve 304 during elevator pin 98 extension.

Elevator pin 98 extension is a two-stage process. During the first stage, the working sleeve 310 slides along the intermediate sleeve 304. The spring member 306 biases the intermediate sleeve 308 in a fixed position within the fixed sleeve 302. The second stage begins when the working sleeve 310 extends to reach a maximum extension relative to the intermediate sleeve. The spring member 306 lengthens and allows the intermediate sleeve 304 to slide. The intermediate sleeve 304 slides within the fixed sleeve 302 to enable the working sleeve 310 to extend. Accordingly the working sleeve 310 cooperates with the intermediate sleeve 304 to enables optimal extension of the elevator pin 98 while maintaining precise alignment between the working sleeve 310 and the fixed sleeve 302 during both the initial and later stages of elevator pin 98 extension.

FIG. 34 and FIG. 35 show a variation of the elevator pin 98 in a retracted configuration and in an extended configuration, respectively. The fixed sleeve 302 surrounds the working sleeve 310. The working sleeve 310 includes a cap 314, which overhangs the fixed sleeve 302. During extension, the working sleeve 310 and the intermediate sleeve 304 rotates long a helical path with respect to the fixed sleeve 302. Accordingly, the working sleeve 310 rotates to extend the elevator pin 98.

Figure 36:
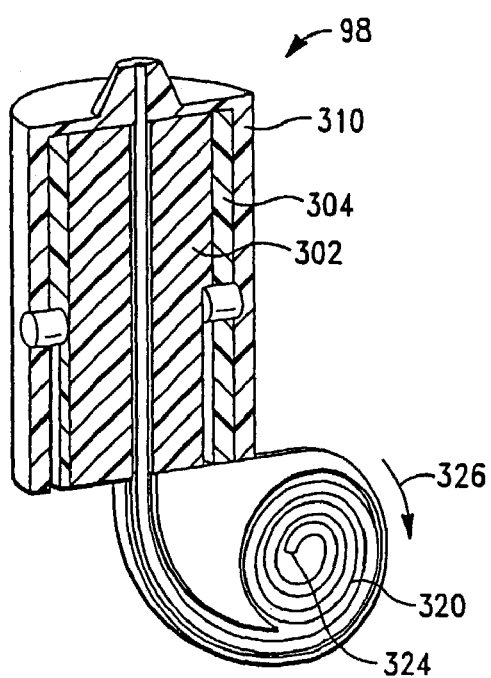
FIG. 36 and FIG. 37 show a perspective view of a variation of an elevator pin in accordance with the present invention in a retracted and extended configuration, respectively.

FIG. 36 shows a variation of the telescoping elevator pin 98. The elevator pin 98 has a coil spring 320 with two ends 322 and 324. The end 322 of the coil spring 320 presses against the working sleeve 310 to slide the working sleeve 310 relative to the intermediate sleeve 304 and thereby actuate the elevator pin 98. Rotation of one end 324 of the coil spring in the direction of the arrow 326 uncoils the spring 320, causing the other end 322 to press against the working sleeve 310 and extend the elevator pin 98. Counter-rotation of the one end 322 of the coil spring 320 causes the other end 324 to retract the elevator pin 98.

Figure 37:
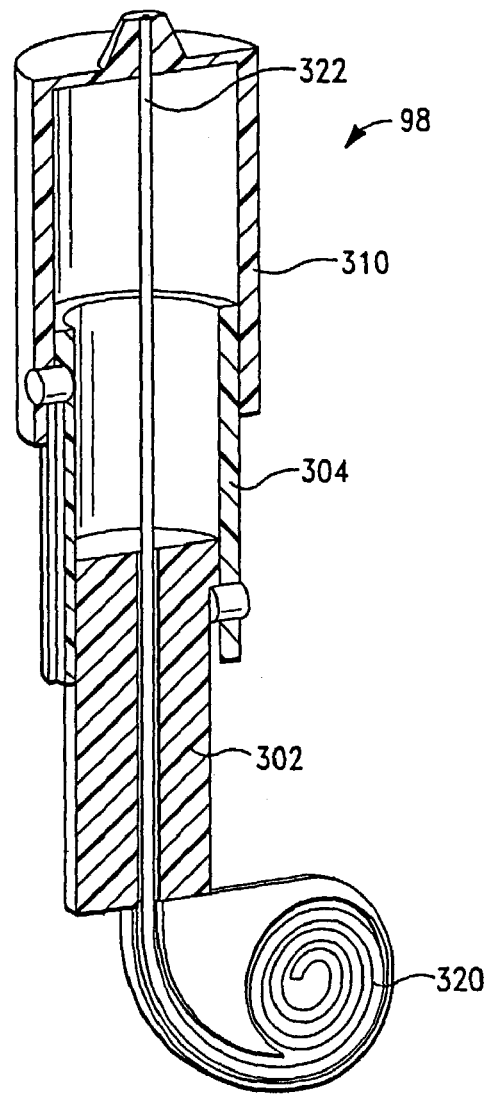
Figure 38:
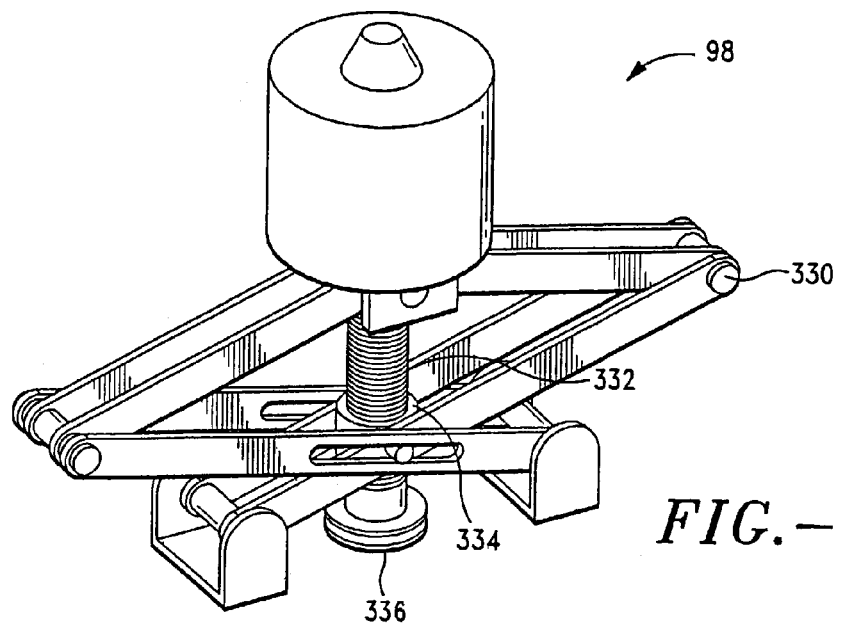
FIG. 38 and FIG. 39 show a perspective view of a variation of an elevator pin in accordance with the present invention in a retracted and extended configuration, respectively.
Figure 39:
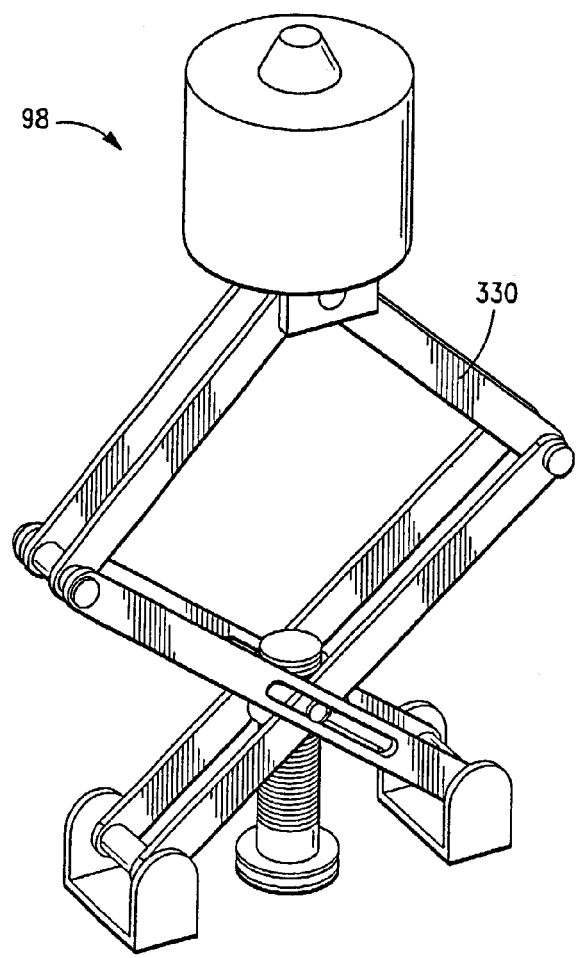

FIG. 37 shows the elevator pin 98 fully extended. The second end 322 presses against the working sleeve 310. The spring 320 partially uncoils to support the elevator pin 98 in the fully extended configuration FIGS. 38 and 39 shows a linkage assembly 330 and elevator pin 98 combination in a retracted and extended configuration, respectively. The linkage assembly 330 includes a rotatable actuator 332, a threaded sleeve 334 and a pulley mechanism 336. The actuator 332 includes a threaded shaft. The linkage assembly 330 includes linkage members 338. The linkage members 338 have scissor joints. A motor rotates the pulley mechanism 336. The pulley mechanism 336 rotates the actuator 332 with respect to the sleeve 310. The sleeve 310 is joined to at least one linkage member 338 so when the sleeve 310 moves, the linkage assembly 330 scissors to actuate the elevator pin 98. The linkage assembly 330 extends and retracts the elevator pin 98.

Figure 40:
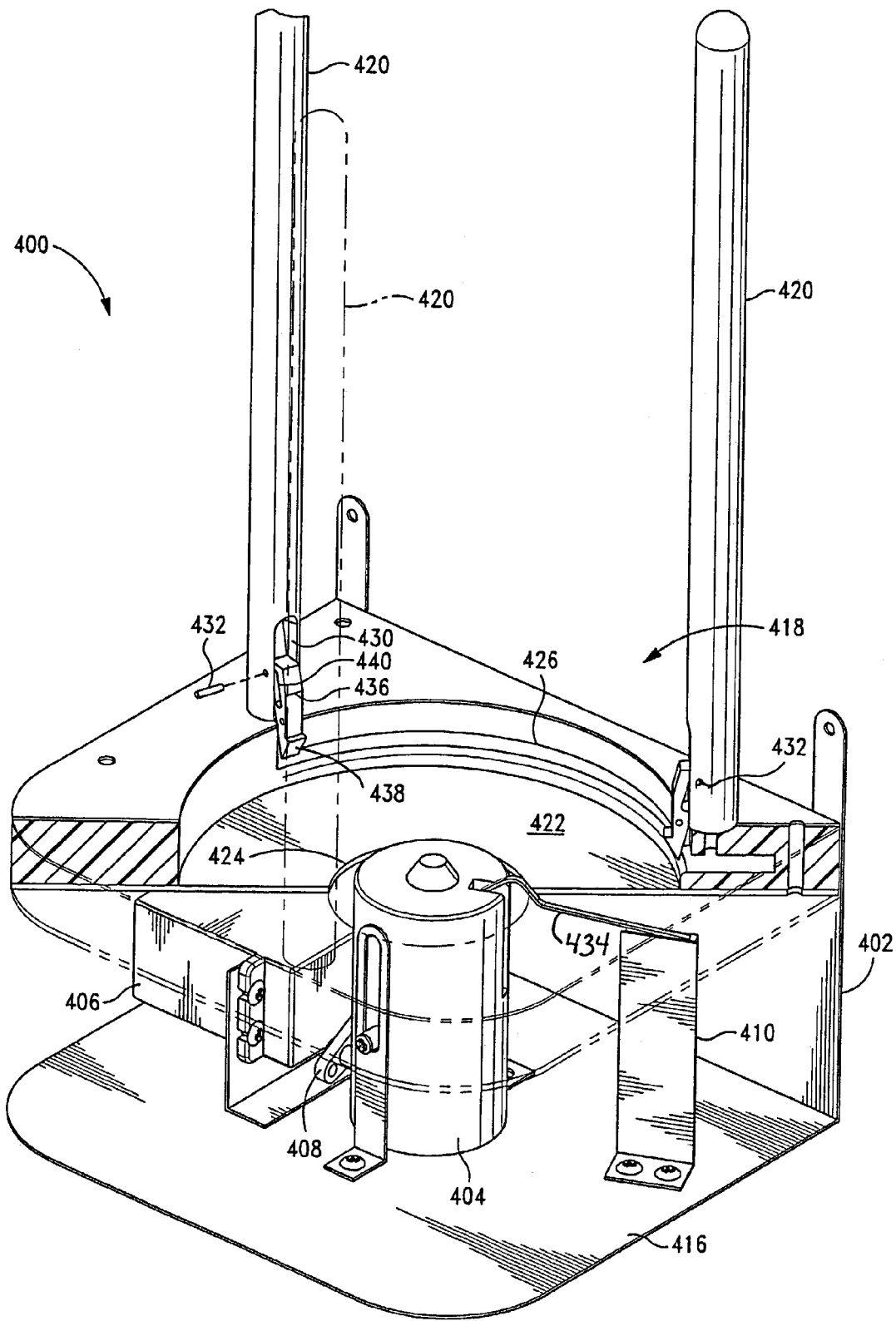
FIG. 40 shows a memory storage device handling system having a servo driven elevator pin.

FIG. 40 shows a memory storage device handling system generally designated with the reference numeral 400. The system 400 includes a housing 402, an elevator pin 404, a servomotor 406, a linkage assembly 408 and a sensor 410.

The housing 402 defines a base 416 and a hopper generally designated with the reference numeral 418. The hopper 418 functions to hold memory storage disks in a stack, preferably a vertical stack.

The hopper 418 has a stack retainer including posts 420. Three posts 420 define a periphery of the hopper 418. The base 416 is planar and the posts 420 extend perpendicularly with respect to the base 416.

The hopper 418 includes a bottom 422 with an opening 424 for enabling the elevator pin 404 to extend from below the hopper 418, through the bottom of the hopper 418. The hopper 418 has a lateral opening 426 defined on the periphery of the hopper 418 near the bottom 422 of the hopper 418. Disks feed through the lateral opening 426 to rest near the bottom 422 of the hopper 418 on the elevator pin 404. The elevator pin 404 lifts resting disks into the stack retainer portion of the hopper 418, which is the portion of the hopper 418 situated above the lateral opening 426.

Each post 420 includes a pawl slot 430, a pawl pin 432 and a pawl 436. Each pawl 436 includes first end with a hook 438 for holding disks. Each pawl 436 includes a second end inserted into the pawl slot 430. The pawl pin 432 extends through the second end of each pawl 436 to slidably hold each pawl 436 in one of the pawl slots 430.

Each pawl 436 has pin opening 440 for receiving a pawl pin 432 and enabling the pawl 436 to slide between an extended position where the hook 438 extends from the post 420 to a retracted configuration where a portion of the second end of the pawl 436 extends into the pawl slot 430. The pawls 436 hold disks in the extended configuration and, in the retracted configuration the pawls 436 enable the elevator pin 404 to lift disks into a stack from the bottom.

The sensor 410 for detects the position of the elevator pin 404 with respect to the base 416. The sensor 410 includes the mechanical arm 434, which engages a portion of the elevator pin 404 to directly measure the position of the elevator and 404. Although a sensor with the mechanical arm is used in accordance with the present invention a can be appreciated that the position sensor can also include an optical sensor element or a magnetic sensor element.

Figure 41:
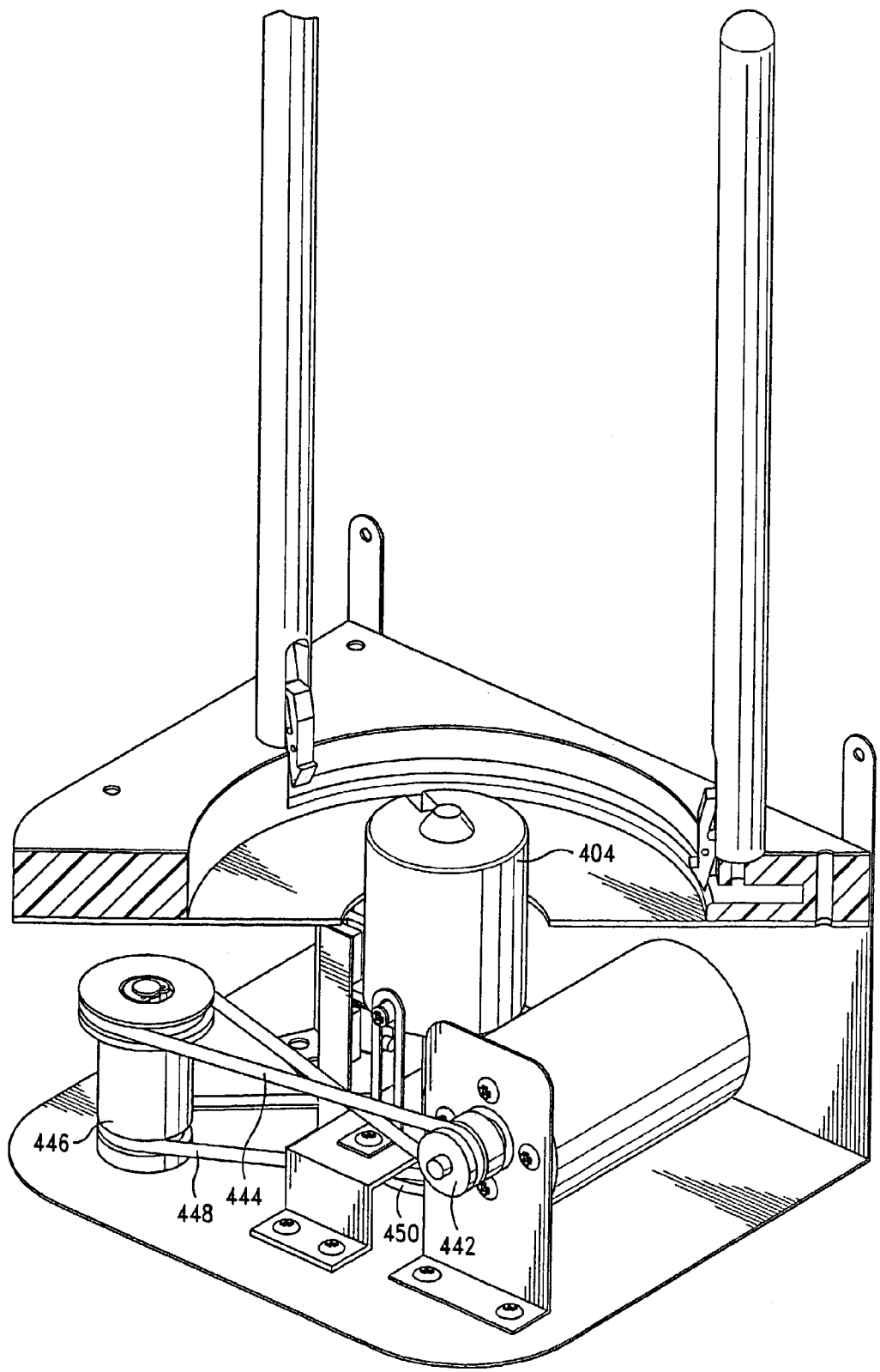
FIG. 41 shows a linkage assembly includes pulleys and belts.

FIG. 41 shows an embodiment of the present invention where the linkage assembly 408 includes belts and pulleys. The linkage assembly 408 includes a drive pulley 442, a first drive belt 444, an intermediate pulley 446, a second drive belt 448 and an elevator pin pulley 450 operably interconnected to move the elevator pin. Rotation of the elevator pin pulley 450 lifts the elevator pin 404. Alternatively, a mechanism as described with respect to FIG. 38 can be used to lift the elevator pin. There are other ways to lift an elevator pin in response to rotation of a pulley. For example a geared linkage assembly could be substituted in accordance with the present invention for the pulley mechanism, or the cam mechanisms disclosed herein.

Figure 42:
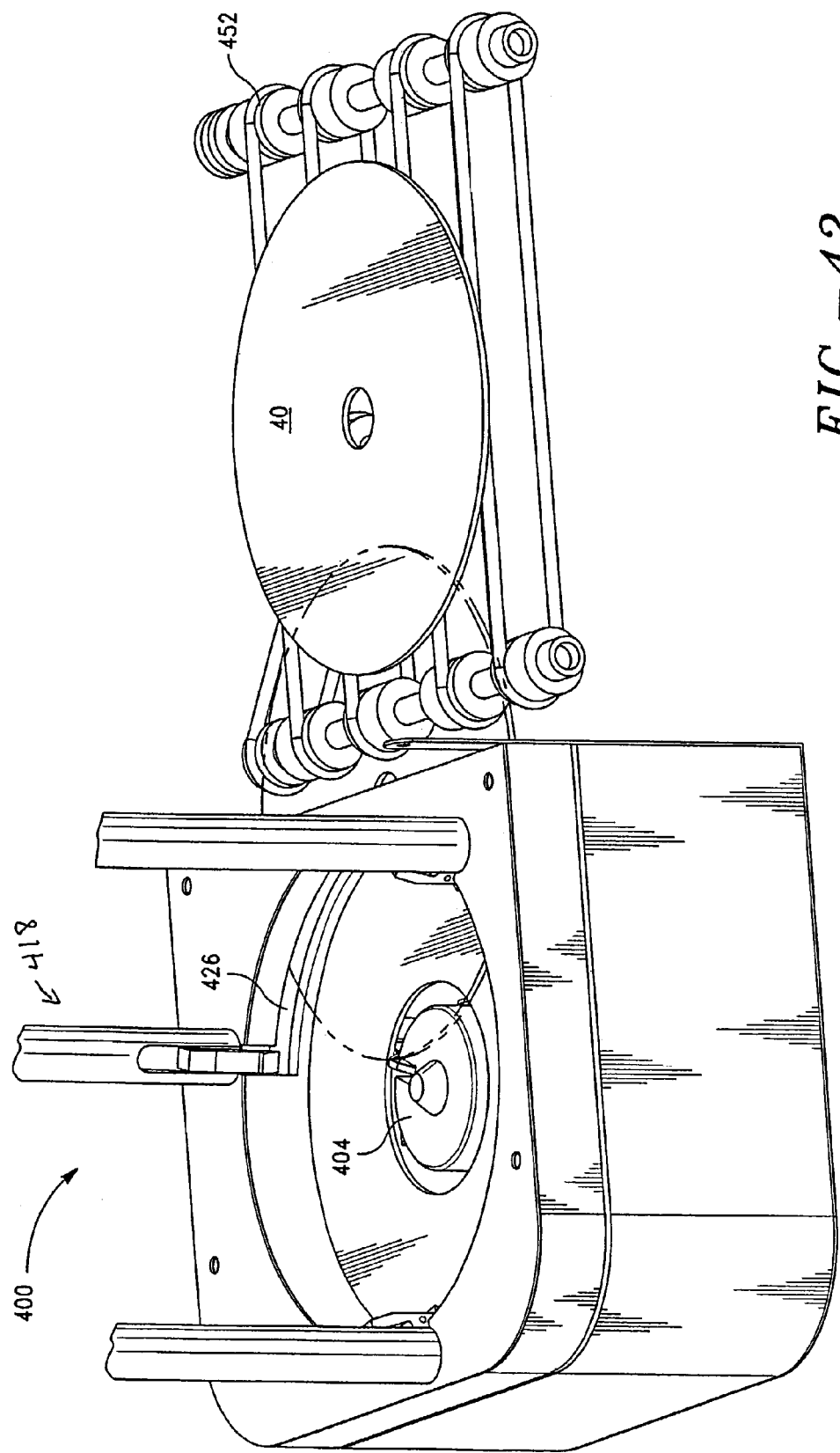
FIG. 42 shows a conveyer feeding a disk into a hoper via a lateral opening in the hopper.

FIG. 42 shows for a memory storage device handling system 400 including a conveyor 452. The conveyor 452 delivers disks 40 through the lateral opening 426. Accordingly, the conveyor 423 delivers a memory storage disk 40 to the memory storage device handling system 400 so that the elevator pin 404 can stack the delivered disk 40 in the hopper 418.

FIG. 43A, FIG. 43B, FIG. 43C and FIG. 43D show operation of the elevator pin 404 and the pawls 436. FIG. 43A shows the elevator pin 404 lifting a single disk 40 into a stack 454 of disks. The elevator pin 404 presses the single disk 40 upwards in the direction of the arrow 456. The single disk 40 engages the stack 454 of disks 40 from the bottom and presses into the stack 454.

FIG. 43B shows that pressing the disk 40 into the stack 454 lifts the stack 454 upwards in the direction of the arrow 458 and adds the single disk 40 to the stack 454 from the bottom of the stack 454. The stack 454 lifts the pawls 436 and causes the pawls 436 to retract into the respective posts 420.

FIG. 43C shows the single disk 40 defining the bottom of the stack 454, which passes the hooked end 438 of each pawl 436. When the bottom of the stack 454 lifts above the hooked end 438 of the pawls 436, the pawls 436 drop downwards into an extended configuration under the influence of gravity, in the direction of the arrows 460.

FIG. 43D shows the elevator pin 404 lowering in the direction of the arrows 462, allowing the stack 454 to rest on the hooked ends 438 of the pawls 436.

Although only a few disks are shown in the stack 454. The present invention is intended to lift a multitude of disks. For example, one hundred or more disks can be lifted by the elevator pin 404 in accordance with the present invention.

Figure 44A:
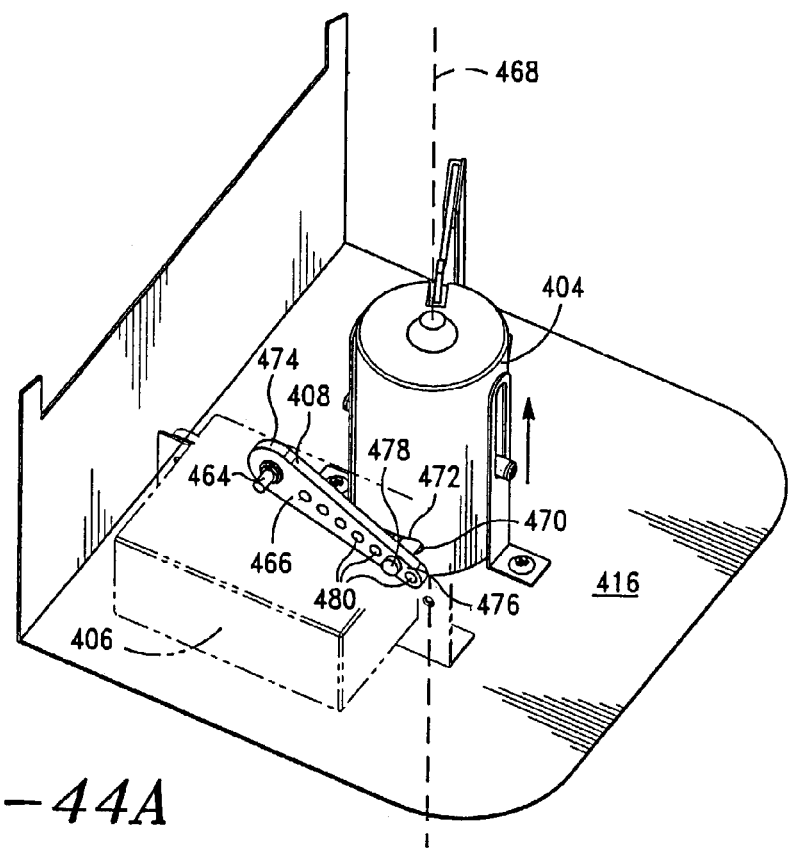
FIGS. 44A and 44B show the linkage assembly of the present invention having a cam pin that slides on a cam surface defined by the elevator pin.

FIG. 44A shows an embodiment of the linkage assembly 408. The servomotor 406 includes a shaft 464. The servomotor 406 reciprocates the shaft 464 over an arc of less than 360 degrees. Preferably a servomotor 406 reciprocates the shaft 464 over an arc of less than 90 degrees to rapidly and precisely lift and lower the elevator pin 404.

The linkage assembly 408 includes an arm 466 that mechanically connects the servomotor shaft 464 to the elevator pin 404. The arm 466 has two ends 474 and 476. The end 474 fixedly mounts on the shaft 464 of the servomotor 406. The motor 406 rotates the shaft 464 to pivot the arm 466.

The elevator pin 404 defines an axis 468 that is perpendicular to the base 416 and parallels the force of gravity. The end 474 of the arm 466 cams against the elevator pin 404 to selectively lift and lower the elevator pin 404 along the axis 468.

The elevator pin 404 includes a slot 470 near the base of the elevator pin 404. The slot 470 parallels the base 416 and defines an internal cam surface 472. The end 476 of the arm 466 includes a cam pin 478 that extends through the arm 466 to engage the cam surface 472 of the slot 470. The cam pin 478 slides against the cam surface 472 to selectively lift or lower the elevator pin 404. According to one aspect of the invention, the cam pin 478 includes cylindrical roller that cams against the elevator pin 404.

The arm 466 includes several connection points 480 that enable the cam pin 478 to attach to any of the several connection points 480. The connection points 480 facilitate adjustment of the linkage assembly 408 to achieve precise movement of the elevator pin 404. The cam motor 406 is regulated to precisely rotate the arm 466 over a predetermined angle to lift and lower the elevator pin 404.

It can be appreciated that although the elevator pin 404 includes a cam slot 470, that the present invention does not necessarily require a slot 470 to achieve precise movement of the elevator pin 404.

The cam pin 478 and the elevator pin 404 are adapted, according to an alternate aspect of the invention, to engage a bottom portion of the elevator pin 404. A further alternative include configuring the elevator pin 404 with a protruding cam surface that extends from the periphery of the elevator pin 404 and engages the cam pin 478 to lift the elevator pin 404.

Figure 44B:
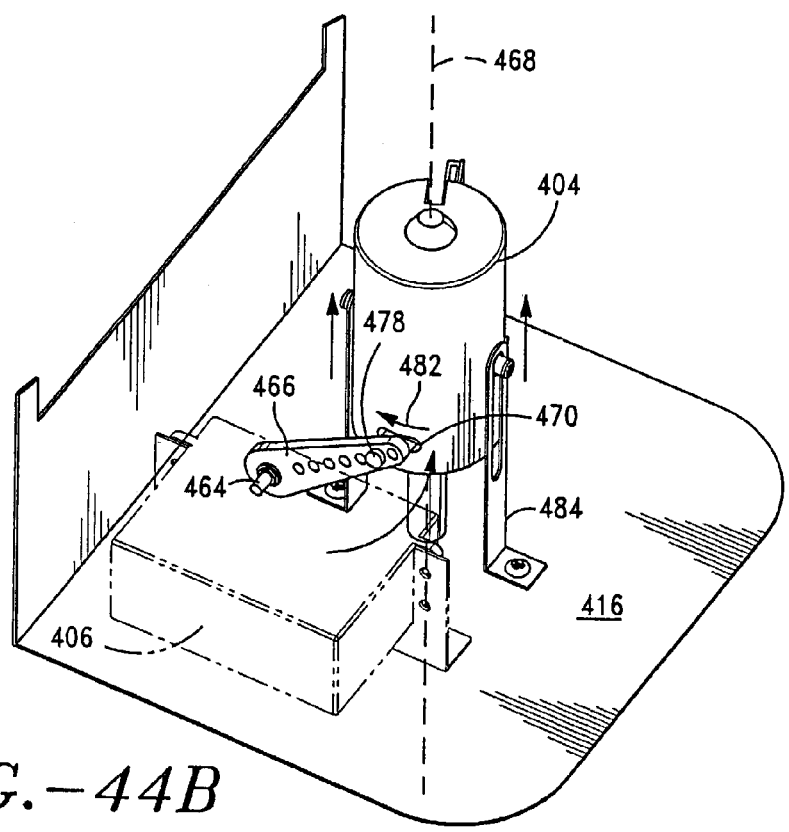

FIG. 44B shows the servomotor 406 rotating the shaft 464 to pivot the arm 466 and thereby lift the elevator pin 404 along the axis 468 and upwards with respect to the base 416. The cam pin 478 slides with respect to the slot 470 of the elevator pin 404 in the direction of the arrow 482, which parallels the base 416, as the elevator pin 404 lifts. Reciprocation of the servomotor 406 lowers the elevator pin 404.

According to one aspect of the invention at least one guide 484 that attaches to the base 416 to guide the elevator pin 404. The guide 484 prevents rotation of the elevator pin 404 for about the axis 468.

Figure 45A:
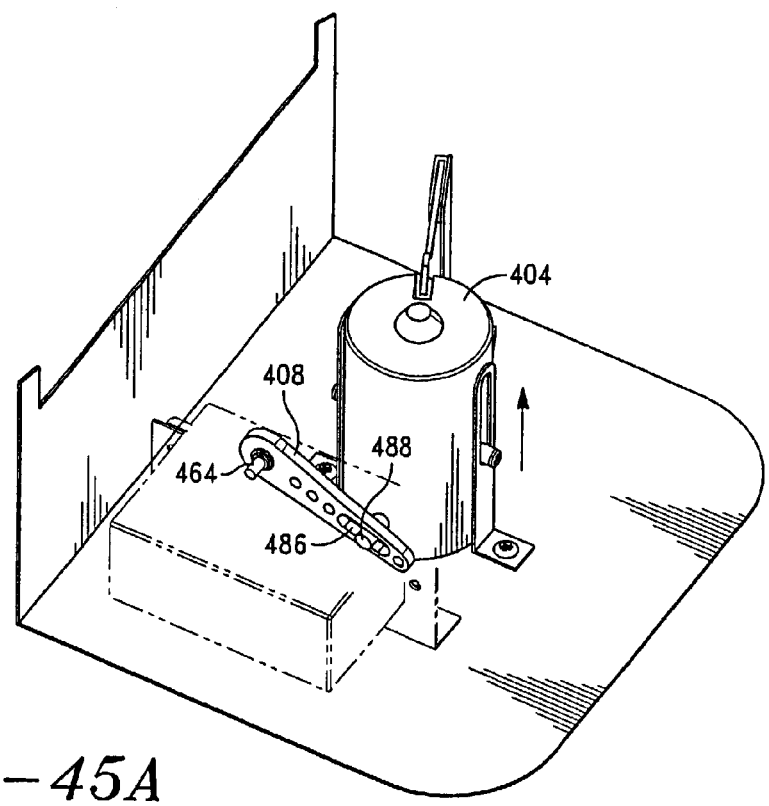
FIGS. 45A and 45B show the linkage assembly of the present invention including a cam slot that slides with respect to the elevator pin.

FIG. 45A shows an alternate embodiment of the linkage assembly 408 where the arm 410 defines a slot 486 and the elevator pin 404 includes a cam pin 488. The cam pin 488 extends radially outward from the elevator pin 404 and slidably engages the slot 486 of the arm 466. The slot 486 aligns between the shaft 464 and the cam pin 488 of the elevator pin 404.

Figure 45B:
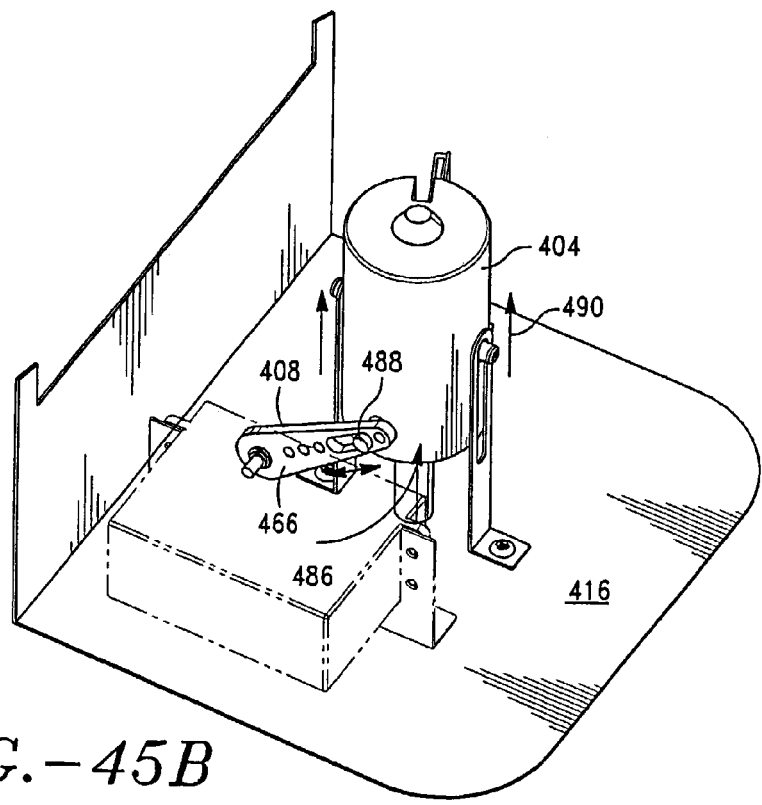

FIG. 45B shows the arm 466 pivoting to lift the elevator pin 404 upwards, away from the base 416 in the direction of the arrow 490. The cam pin 488 slides within the slot 486 to enable the arm 466 to lift the elevator pin 404. Although the slot 486 is shown, the slot 486 is not required. The arm 466 can be modified with an alternate cam surface, not including a slot.

Figure 46A:
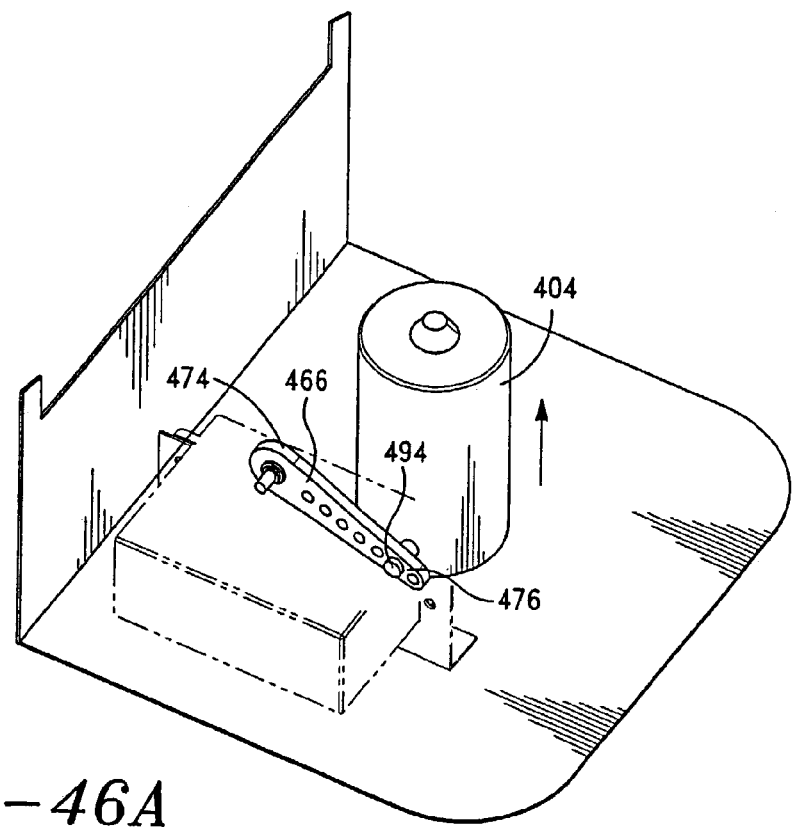
FIGS. 46A and 46B show the linkage assembly of the present invention including an arm with two fixed ends.

FIG. 46A shows a variation of the linkage assembly 408 where the arm 410 has two fixed ends and a rotatable cam pin 494. The end 474 affixes to the shaft 412. The end 476 affixes to the cam pin 494, which inserts into the elevator pin 404.

Figure 46B:
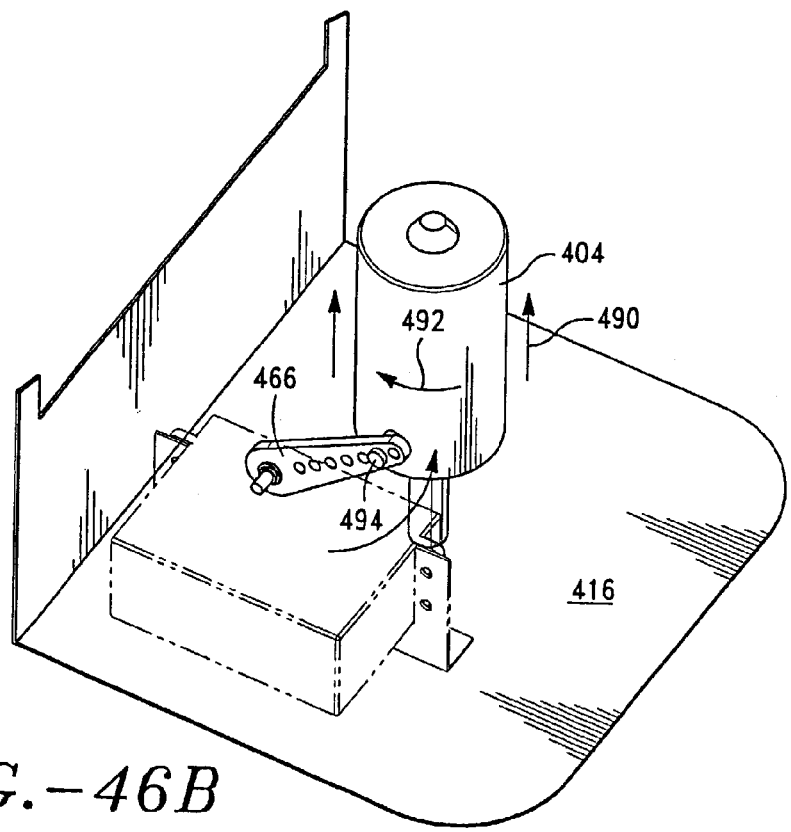

FIG. 46B shows the arm 466 lifting the elevator pin 404. As the elevator pin 404 lifts away from the base 416 in the direction of the arrow 490. While the elevator pin 404 lifts, the arm 466 rotates the elevator pin 404 in the direction of the arrow 492. Preferably the cam pin 494 includes a ball and socket connection with the arm 466 to prevent the arm 466 and cam pin 494 from binding.

FIG. 47A shows an alternate embodiment of the linkage assembly 408 including a pin cam pin 498, a rocker arm 494, and a cam bud 500. The servomotor 406 a rotates the cam bud 500 in the direction of the arrow 502 to actuate the rocker arm 496. Movement of the rocker arm 496 lifts and lowers the elevator pin 404. The servomotor 406 reciprocates to lower the elevator pin 404 in accordance with one aspect of the invention, and the servomotor 406 rotates in a single direction in accordance with an alternate aspect of the invention.

FIG. 47B shows the servo motor 406 reciprocating the cam bud 500 in the direction of the arrow 504 to actuate the rocker arm 496 to lift the elevator pin 404.

Figure 48A:
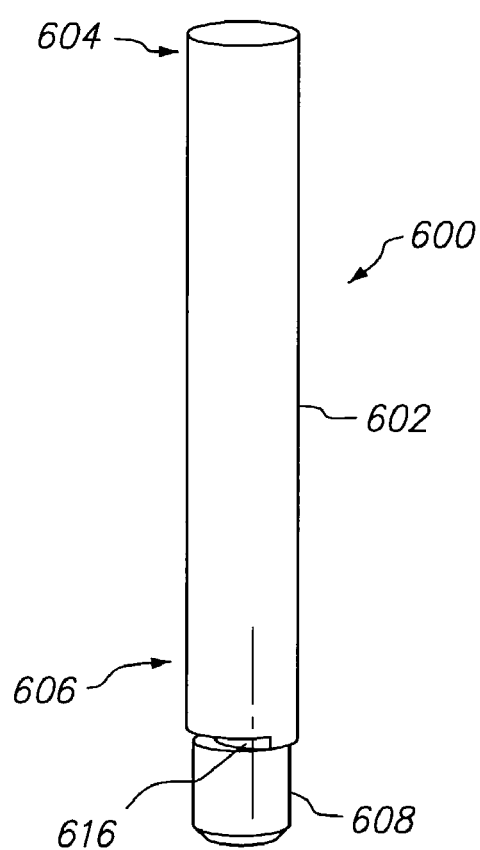
FIG. 48A is a perspective view of another embodiment of a disk dispenser of the present invention in a withdrawn position for loading the disk dispenser with a stack of disks.
Figure 48B:
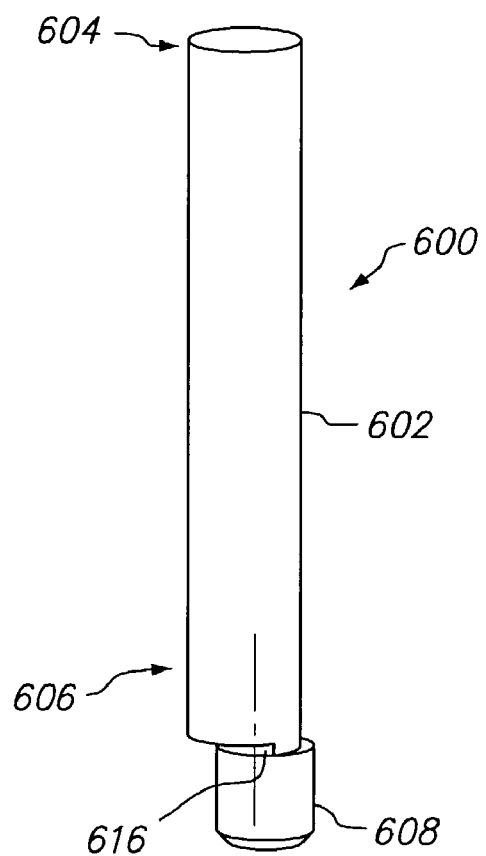
FIG. 48B is a perspective view of the disk dispenser of FIG. 48A in an extended position for supporting the stack of disks.

FIGS. 48A and 48B show a variation of a disk dispenser for dispensing at least one disk from a stack of disks. The disk dispenser is generally designated with the reference numeral 600. FIGS. 48A and 48B show the disk dispenser 600 in a withdrawn position and an extended position, respectively. The disk dispenser 600 includes a spindle 602 and a pusher 614. The disk dispenser 600 dispenses disks from the bottom of a stack of disks to a printer or duplicating device.

The spindle 602 includes a first end 604 and a second end 606. The second end 606 has a disk support foot 608 arranged to support a stack of disks 610. The disk support foot 608 is movable from an extended position (as shown in FIG. 48B) at which a portion of the disk support foot 608 is axially extending beyond a diameter of the spindle 602 for supporting the stack of disks 610 and a withdrawn position (as shown in FIG. 48A) at which the portion of the disk support foot 608 is not substantially axially extending beyond the diameter of the spindle for loading the stack of disks 610 onto the spindle. The first end 604 and the second end 606 of the spindle 602 will preferably have a uniform diameter. In a preferred embodiment, the spindle 602 will have an outer diameter of approximately 0.578 inches which will accommodate a standard CD. However, the second end 606 of the spindle 602 can have a slightly smaller diameter than the first end 604 for ease of dispensing a disk onto a tray or into a receptacle.

The disk support foot 608 is attached to the second end 606 of the spindle 602. As set forth above, the disk support foot 608 has a withdrawn position for loading a stack of disks onto the spindle 602 and an extended position for supporting the stack of disks. In the withdrawn position, the portion of the disk support foot 608 is not substantially axially extending beyond the diameter of the spindle 602. Thus, a stack of disks can be loaded onto the spindle 602. In the extended position, a portion of the disk support foot 608 is axially extending beyond the diameter of the spindle 602 to support the stack of disks. Preferably, the disk support foot 608 is movable from the withdrawn position to the extended position by rotating the disk support foot 608. However, it can be appreciated that the disk support foot 608 can be designed with a quick release pin, or any other type of release wherein the disk support foot 608 is movable from a withdrawn position for loading of disks and an extended position for supporting a stack of disks. Alternatively, the disk support foot 608 can be screwed on and off the second end 606 of the spindle 602 to allow a stack of disks to be placed on the spindle. The disk support foot 608 preferably has an outer diameter which is slightly smaller than the outer diameter of the second end of the spindle for ease of loading a stack of disks 610 onto the spindle 612.

In a preferred embodiment, a spacer 616 is positioned between the second end 606 of the spindle 602 and the disk support foot 608. The spacer 616 provides a space for a lower-most disk 612 of the stack of disks 610 to be horizontally displaced by the pusher 614. The spacer 616 will preferably have a height equal to or slightly greater than a height of the lower-most disk. The spacer 616 can be circular, oval or any other shape as long as the spacer 616 allows the lower-most disk to move in a horizontal plane. The diameter of the spacer 616 will vary depending on the diameter of the spindle 602 and central hole of the disks. Preferably, the spacer 616 is a part of the spindle 602. However, it can be appreciated that the spacer 616 can be part of the disk support foot 608. In the preferred embodiment of the present invention, the spacer 616 has an oval shape.

Figure 49A:
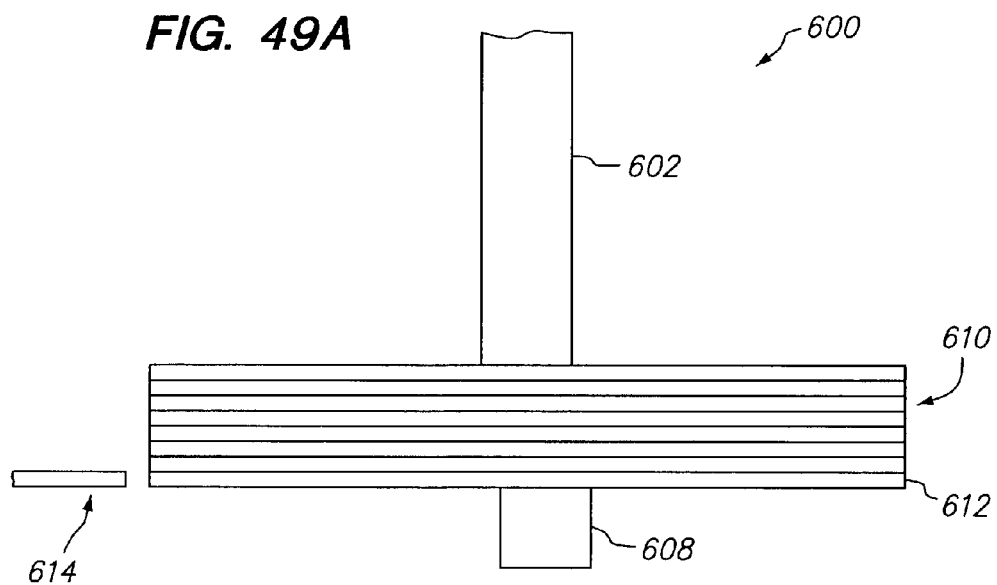
FIGS. 49A–C show the operation of the disk dispenser of FIGS. 48A and 48B wherein the disk dispenser is dispensing a lower-most disk from the stack of disk.
Figure 49B:
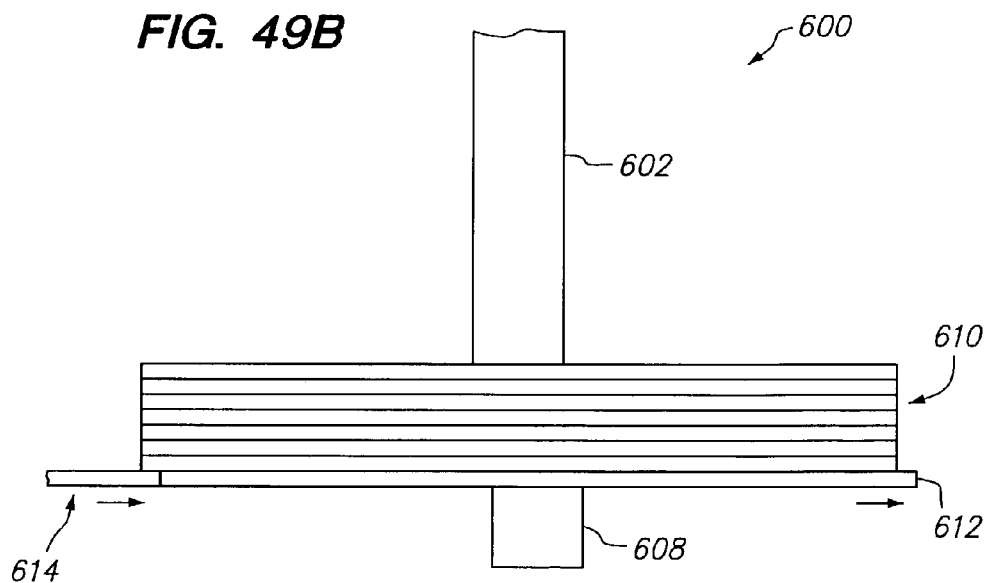
Figure 49C:
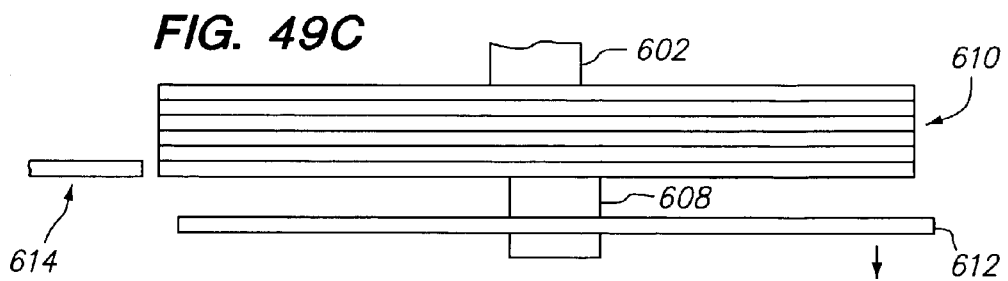

FIGS. 49A–C show the disk dispenser 600 is operation. In FIG. 49A, a stack of disks 610 have been loaded onto the spindle 602, and the disk support foot 608 placed in an extended position. In a preferred embodiment, the disk support foot 608 rotates from the withdrawn position as shown in FIG. 48A to the extended position as shown in FIGS. 48B and 49A. The rotation of the disk support foot 608 to the extended position provides support for the stack of disks 610 by engaging the underside of the lower-most disk 612.

As shown in FIG. 49B, the pusher 614 horizontally displaces the lowermost disk 612 from the stack of disks 610. The pusher 614 engages an outer edge of the lower-most disk 612 and horizontally displaces the lower-most disk 612. The lower-most disk 612 moves from a position which is axially aligned with the spindle 602 and supported by the disk support foot 608 to a position which is not supported by the disk support foot 608. As shown in FIG. 49C, the horizontal displacement of the lower-most disk 612 drops the lower-most disk 612 from the stack of disks 610 onto a tray or into a receptacle. Preferably, the pusher 614 separates at least one disk from the stack of disks and can be designed to separate two or more disks at a time. The pusher 614 can displace the lower-most disk 612 and any adjacent disk from the stack of disks 610 by engaging the outer edges of the lower-most disk 612 and adjacent disks up to the number of disks to be dispensed.

The pusher 614 will preferably have a uniform thickness which is equal to or slightly smaller the thickness of the lower-most disk 612. The thickness of the pusher 614 will approximate the thickness of an individual disk to be dispensed so that when the pusher 614 slides the lower-most disk 612 is dispensed. If more than one disk is being separated the pusher 614 will have a thickness equal to or slightly smaller than the number of disks being separated.

The pusher 614 is controlled by a motor assembly including a motor and a gear system. Preferably, the motor is a servomotor which reciprocates the gear system to precisely move the pusher 614 in-and-out or forward and back.

Preferably, the stack of disks 610 are circular disks having a central hole of a uniform diameter. For example, in one embodiment, the spindle 602 will have a diameter of approximately 0.578 inches which will accommodate a standard compact disk having an overall diameter of about 4.72 inches with a central hole having a diameter of 0.59 inches. It, however, can be appreciated that the spindle 602 can vary to accommodate disks having a central hole of any diameter, including disks that have a central hole with a diameter greater or smaller than 0.59 inches.

Figure 50:
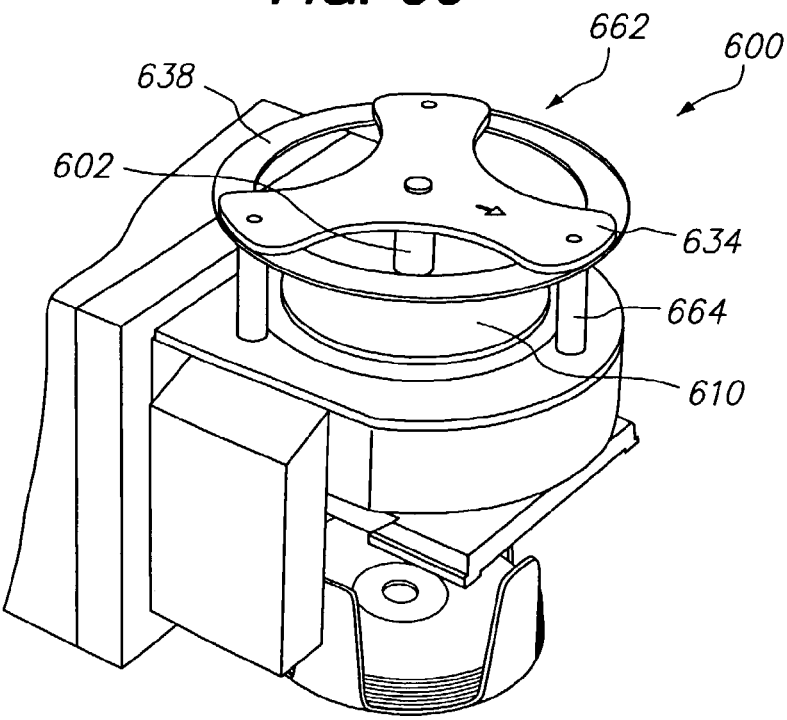
FIG. 50 is a perspective view of a disk dispenser and housing for dispensing disks from a stack of disks.

FIG. 50 is a perspective view of an alternative embodiment of a disk dispenser 600 according to the present invention. The disk dispenser 600 includes a spindle 602, a pusher 614, an upper plate 634, and a disk housing 660. The disk housing 660 includes a feed hopper 662, a retainer foot 622, a top support ring 638, a bottom plate 636, and a motor assembly 650.

In a preferred embodiment of the present invention, a plurality of posts 664 define the feed hopper 662 which assists with the spindle 602 to support the stack of disks 610 in an upright position. The feed hopper 662 assists with the loading process by guiding the stack of disks 612 into the disk housing 660. The feed hopper 662 will generally include at least three posts 664.

Although the posts define the feed hopper 662 and provide a light-weight structure to guide the stack of disks 610, one can appreciate that the feed hopper 662 may assume any of a number of configurations. A cylindrical wall may define a feed hopper 662, for example. Also, for example, a helical coil, or another structure having a light-weight design could define the feed hopper 662. The feed hopper 662 is generally designed to hold between 25 and 150 disks depending on the size of the disk dispenser 600. It can be appreciated that the disk dispenser 600 can be designed with or without the feed hopper 662. If a feed hopper 662 is not utilized, the top support ring 638 defines the top of the disk dispenser 600.

Figure 51:
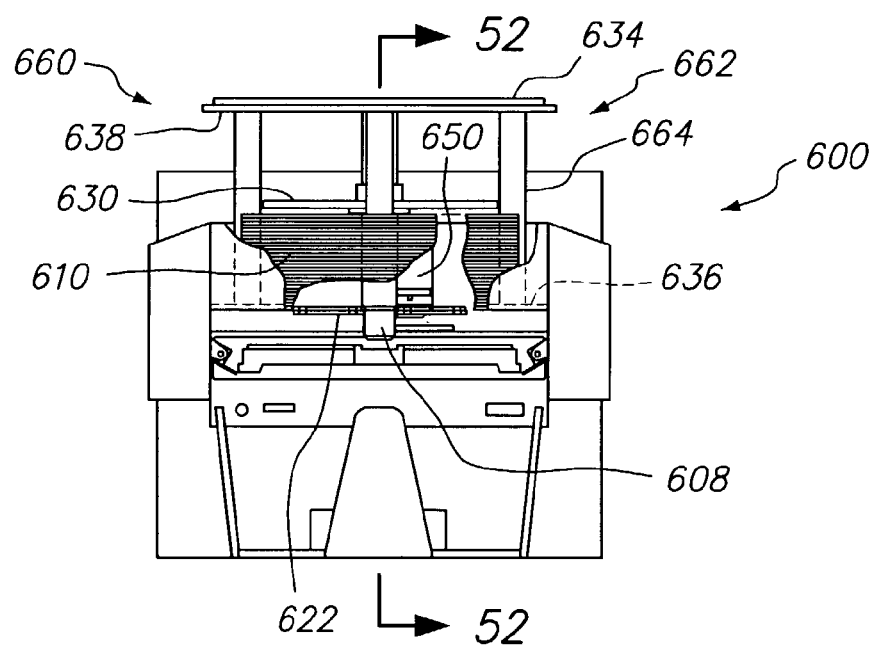
FIG. 51 is an end elevation view of the disk dispenser and housing of FIG. 50.

FIG. 51 is an end elevation view of the disk dispenser 600 including the housing 660. The bottom plate 636 defines the bottom of the feed hopper 662 and generally has a circular opening to enable a disk to pass through the bottom plate 636. The bottom plate 636 is sized for a disk to pass through when the disk parallels the bottom plate 636. The retainer foot 622 is preferably attached to the bottom plate 636 to support the stack of disks 610.

The retainer foot 622 contacts the underside of the lower-most disk 612 and provides additional support for the stack of disks 610. Preferably, the retainer foot 622 is located beneath the pusher 614 to ensure that the lower-most disk 612 is positioned for contact by the pusher 614. In addition, the pusher 614 slidably mounts above the retainer foot 622 to selectively dispense the lower-most disk 612 from the stack of disks 610. In addition, the retainer foot 622 stabilizes the stack of disks 610, which enables the pusher 614 to displace the lower-most disk 612.

In one embodiment, a weight 630 is placed on top of the stack of disks 610 to assist with the dispensing of the bottom disk 612 from the spindle 602. The weight 630 will preferably weigh between four to 16 ounces which provide sufficient downward force on the stack of disks 610 to allow the pusher 614 to separate the lower-most disk 612 from the stack of disks 610. The weight 630 is preferably circular in shape with a central hole of approximately 0.59 inches in diameter or greater. It can be appreciated that the weight 630 can be various shapes as long as the weight 630 can be placed on top of the stack of disks 610 without affecting the dispensing process.

Figure 52:
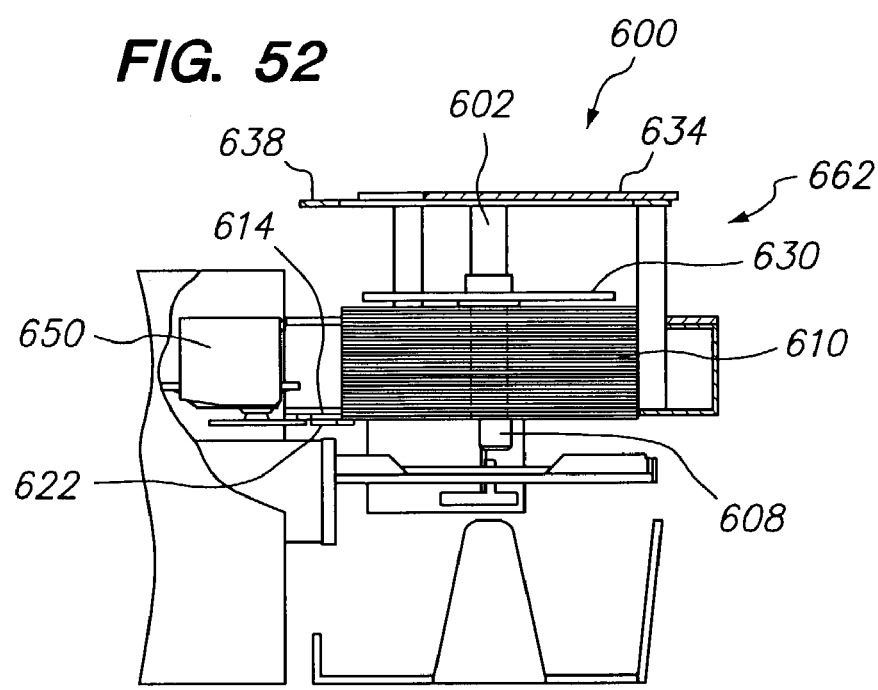
FIG. 52 is a side elevation view of the disk dispenser and housing of FIG. 50.

FIG. 52 is a side elevation view of the disk dispenser 600 showing the disk pusher 614, the disk support foot 608, the stack of disks 610, and the motor assembly 650. The motor assembly 650 preferably includes a servomotor and a mechanical linkage assembly. The motor assembly 650 controls the movement of the pusher 614 in an in-and-out motion. It can be appreciated that the motor assembly 650 can include and type of motor, however, a servomotor is preferable as a result of the servomotor's ability to operate in short and uniform movements. The servomotor will be attached to the pusher 614 through a mechanical linkage assembly. It can be appreciated that the mechanical linkage assembly can include a plurality of gears, arms or other mechanisms to control the in-and-out motion of the pusher 614.

Figure 53:
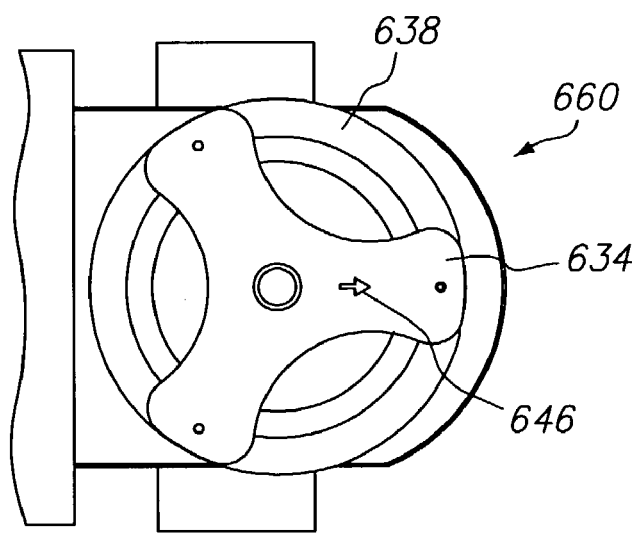
FIG. 53 is a top elevation view of the disk dispenser and housing of FIG. 50.

FIG. 53 is a top view of the disk dispenser 600 and housing 660. As shown in FIG. 53, the upper plate 634 is attached to the first end 604 of the spindle 602 and provides a means for positioning the spindle 602 and disk support foot 608 in the housing 660. The upper plate 634 can have a plurality of grooves or slots to correctly position the upper plate 634 on the top support ring 638. The upper plate 634 including the spindle 602 and disk support foot 608 preferably rests on top of the top support ring 638. In addition, the upper plate 634 cooperates with the top support ring 638 to allow the spindle 602 and disk support foot 608 to be easily removed from the disk dispenser 600. The upper plate 634 has preferably a three-leaf cloverleaf shape for ease of handling. However, the upper plate 634 can assume various other shapes or configurations. In a preferred embodiment, the upper plate 634 has some type of indicia 646, for example, an arrow, to assist with placement of the upper plate 634 within the housing 660 of the disk dispenser 600.

In a preferred embodiment, the top support ring 638 is positioned on top of the feed hopper 662. The top support ring 638 is preferably circular in shape and is slightly larger than the diameter of the stack of disks 610. The top support ring 638 enables the spindle 602 and disk support foot 608 to be positioned within the feed hopper 662. The top support ring 638 further positions the upper plate 634, spindle 602, and disk support foot 608 within the housing 660 including positioning the lower-most disk 612 adjacent to the pusher 614. The top support ring 638 can also have a plurality of grooves or slots for ease of communication with the upper plate 634. As with the upper plate 634, the top support ring 638 can also take on any type of shape and/or configuration, including rectangles and/or oval shapes, depending on the type of disk and/or medium that is being used.

In order to load the disk dispenser 600 with a stack of disks 610, the spindle 602 and disk support foot 608 is removed from the disk housing 660 by grasping the upper plate 634 and lifting upward. Once, the upper plate 634, spindle 602 and disk support foot 608 is removed from the housing, and the disk support foot 608 is rotated from the extended position to the withdrawn position. In the withdrawn position a user slides a stack of disks onto the spindle 602. Once the spindle 602 has been loaded with a stack of disks, the disk support foot 608 is rotated to the extended position to prevent the stack of disks from sliding off the spindle 602. The spindle 602 is then placed back into the disk housing 660 by grasping the upper plate 634 and lowering the stack of disks 610 into the housing 660. The upper plate 634 rests on top of the top support ring 638 and positions the lower-most disk 612 adjacent to the pusher 614 for dispensing of the lower-most disk 612 onto a tray or receptacle.

The disk dispenser 600 as shown in FIGS. 50–53 is useful in conjunction with recording data on memory storage disks such as compact disks, and duplicating compact disks. It can be appreciated, however, that a variety of media including optical or magnetic memory storage media may be dispensed and duplicated in accordance with the present invention.

In addition, the media that may be dispensed by the dispenser 600 as shown in FIGS. 50–53 can include not only circular shapes but rectangular and other various shapes as long as the media or medium has a central hole having a circular, a rectangular or uniform shape. If other shaped mediums are used, the shape of the spindle 602 will be shaped according to the central hole.

Figure 54:
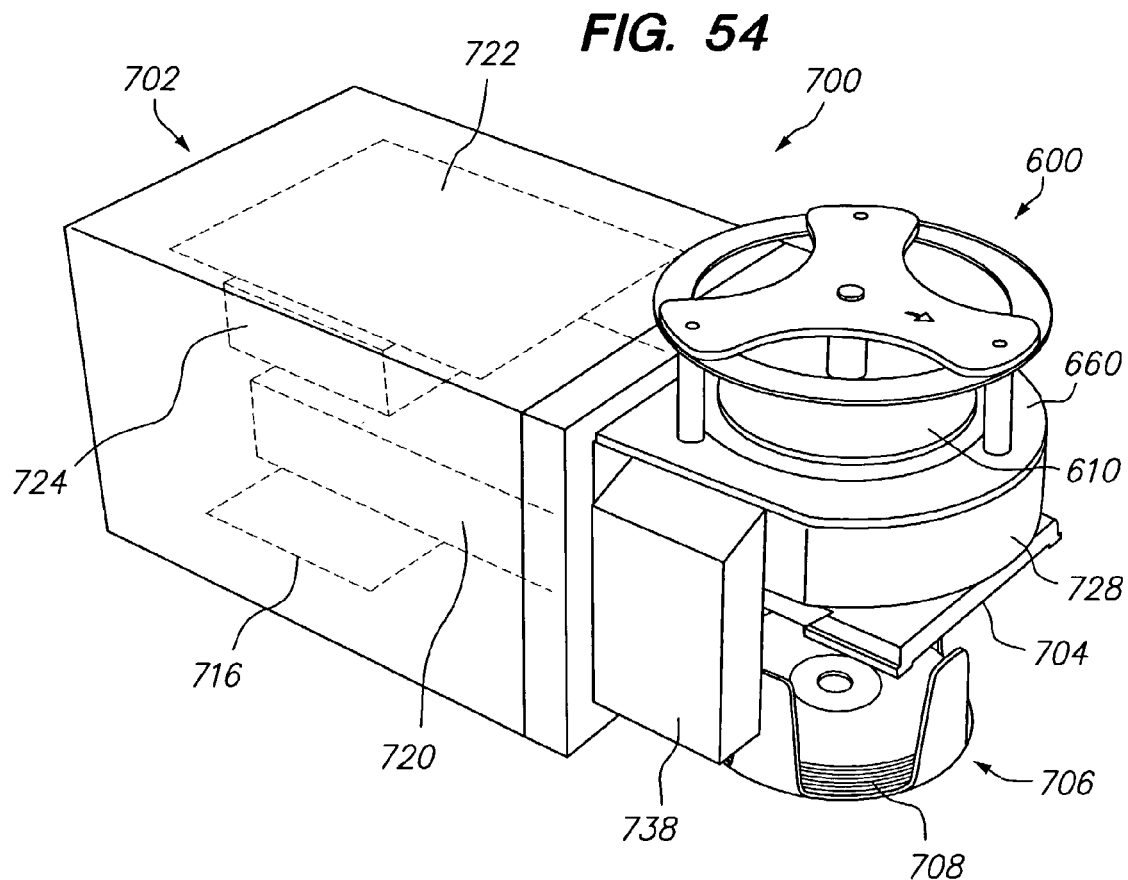
FIG. 54 is a perspective view of an apparatus for writing on disks including a disk dispenser of FIG. 50.

FIG. 54 shows a disk duplication system, generally designated with the reference numeral 700. The system 700 includes a system housing 702 and a disk dispenser 600. The disk dispenser 600 includes at least one disk housing 660 for holding a stack of disks 610 for duplication and/or printing.

The system housing 702 encloses a CD recorder for writing data on the stack of disks 610. The disk dispenser 600 dispenses the lower-most disk 612 or the stack of disks 610 onto a tray 704. The tray 704 accepts the disk 612 from the disk dispenser 600 and retracts into the housing 702 for writing data on the disk 612. When data writing is complete, the tray 704 extends from the system housing 702 and dispenses the disk 612 into a hopper 706 for storing disks 708 which have been recorded. Further dispensing of a disk onto a tray continues, repeating the data writing process. The disk housing 660 is able to accommodate up to 25–50 disks at a time. It can be appreciated that a disk housing 660 can be used to accommodate more than 50–150 disks at a time.

The housing 702 encloses a loader board 716, a writer 720, a copy board 722, and a hard disk drive 724. The hard disk drive 724 couples with the disk writer 720 to deliver data to be written on the lower-most disk 612. A controller or loader board 716, including a circuit board within the housing, regulates operation of the hard disk drive 724, the copy board 722 and a mechanical linkage 744 for controlling the operation of the tray 704. The mechanical linkage 744 includes a loading servomotor 734 for dispensing a disk 612 onto the tray 704 from the disk dispenser 600. The loading servomotor 734 reciprocates a gear system to precisely move the pusher 614 in-and-out or forward and back. The pusher 614 horizontally displaces the lower-most disk 612 from the stack of disks 610 onto the tray 704.

Figure 55:
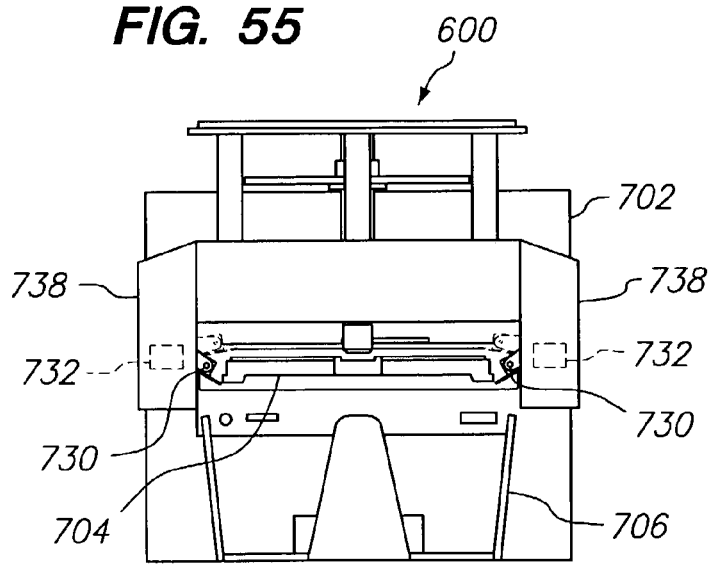
FIG. 55 is an end elevation view of the apparatus for writing on disks of FIG. 54.
Figure 56:
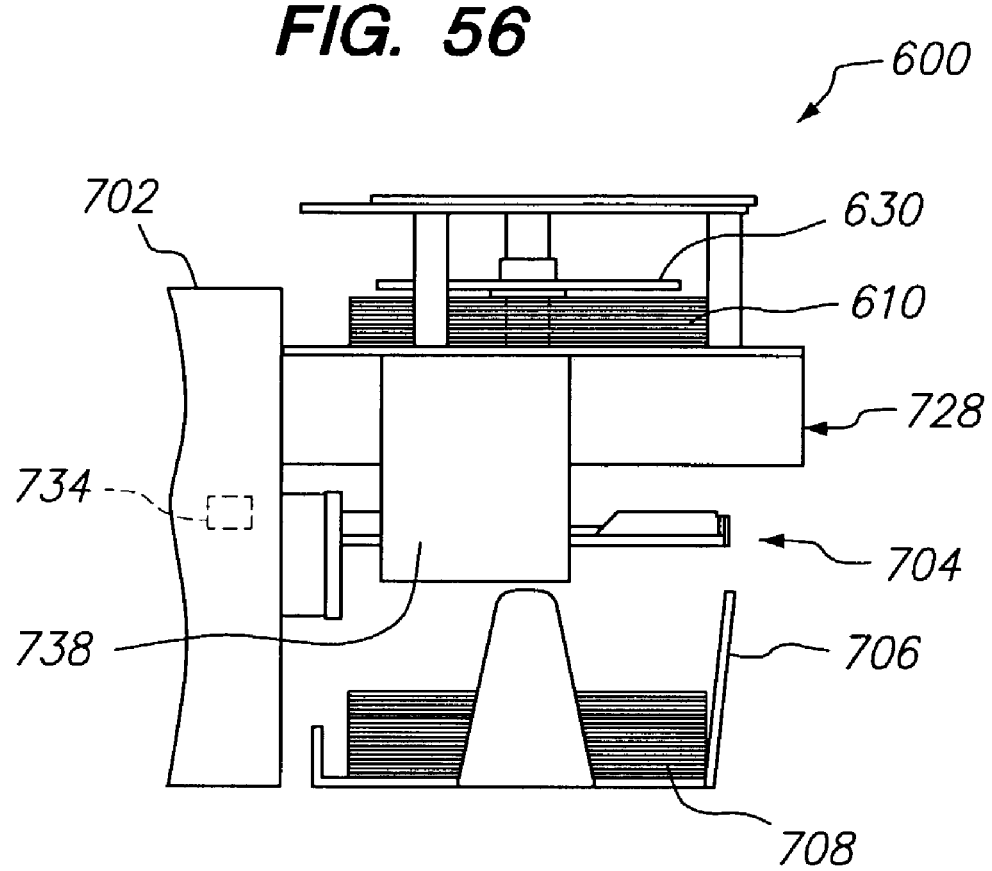
FIG. 56 is a side elevation view of tray assembly of FIG. 54.

FIGS. 55 and 56 show the tray 704 which extends from the housing 702 to accept the lower-most disk 612 from the stack of disks 610 and disk dispenser 600. The tray 704 accepts the lower-most disk 612 from the disk dispenser 600 and retracts into the housing 702 for writing data on the disk 612. When data writing is complete, the tray 704 extends from the system housing 702.

After the data has been written on the disk 612 and the tray 704 extends from the housing 702, a plurality of disk lifters 730 (as shown in FIG. 55) lift the disk 612 from the tray 704. The tray 704 retracts and the disk lifters 730 release the disk 612 into the hopper 706. A pair of servomotors 732 control the movement of the disk lifters 730. A loader enclosure 728 protects the tray 704 and disk dispenser 600 from outside elements including being bumped while dispensing a disk onto the tray 704 or into the hopper 706. A pair of covers 738 protect the servomotors 732 which control the disk lifters 730.

In a preferred embodiment, the apparatus 700 connects to a computer network or a standalone computer by standard connections such as a network card and cable, or a serial cable, respectively. Accordingly, data, which is to be duplicated, is communicated to the system 700 from the computer network or standalone computer. However, it can also be appreciated that the apparatus 700 can independently be designed to function as a standalone duplication or printing apparatus.

It can be appreciated that the apparatus 700 is but one example of a workstation type, which can be used in accordance with the present invention. For example, the disk writer 720 may be replaced with disk printers, disk cleaners, disk surface testing devices and other useful devices in accordance with the present invention.

Once again, the apparatus 700 of the present invention is useful in conjunction with recording data on memory storage disks, such as compact disks and duplicating compact disks. However, it can be appreciated that a variety of media including optical and magnetic memory storage medium may be dispensed and duplicated in accordance with the present invention. According to another variation of the invention, the system housing 702 encloses a CD printer for printing indicia on disk surfaces, and the disk dispenser 600 dispenses disks into the CD printer.

While the present invention is described in terms of preferred embodiments, there are many variations of the invention that are possible. For example, the linkage can be modified to have an elliptical or other curved cam bud, instead of the cam arm shown in the drawings. Also, placement of the servo motor can change, having an appropriate power train for delivering power to the cam that lifts the elevator pin. Accordingly, the invention is to be limited only by the appended claims.

I claim:

1. A disk dispenser, comprising:
   a spindle having a first end and a second end, the second end having a disk support foot arranged to support a stack of disks, wherein the disk support foot is movable from an extended position at which a portion of the disk support foot is axially extending beyond a diameter of the spindle for supporting a stack of disks and a withdrawn position at which the portion of the disk support foot is not substantially axially extending beyond the diameter of the spindle for loading the stack of disks onto the spindle; and
   a pusher for separating at least one disk from the stack of disks on the spindle, and wherein the pusher horizontally displaces a lower-most disk from the stack of disks.

2. The disk dispenser of claim 1, further comprising a spacer located between the second end of the spindle and the disk support foot.

3. The disk dispenser of claim 2, wherein the spacer has a diameter less than a diameter of the second end of the spindle for ease of separating the at least one disk from the stack of disks on the spindle.

4. The disk dispenser of claim 1, wherein the disk support foot is rotatable.

5. The disk dispenser of claim 1, further comprising an upper plate for positioning the spindle within a disk housing.

6. The disk dispenser of claim 1, further comprising a retainer foot located adjacent to the pusher and contacts an underside of a lower-most disk of the stack of disks.

7. The disk dispenser of claim 6, wherein the pusher separates the lower-most disk from the stack of disks.

8. The disk dispenser of claim 1, further comprising a servomotor for controlling the pusher.

9. The disk dispenser of claim 1, further comprising a printer for printing indicia on the at least one disk.

10. The disk dispenser of claim 1, further comprising a disk writer for writing on the at least one disk.

11. The disk dispenser of claim 1, wherein the disk pusher horizontally displaces the lower-most disk by engaging an outer edge of the lower-most disk.

12. The disk dispenser of claim 1, wherein the pusher is slidably mounted above a retainer foot and the pusher selectively dispenses the lower-most disk from the stack.

13. A disk dispenser comprising:
    a spindle having a first end and a second end, the second end having a disk support foot arranged to support a stack of disks, wherein the disk support foot is movable from an extended position at which a portion of the disk support foot is axially extending beyond a diameter of the spindle for supporting a stack of disks and a withdrawn position at which the portion of the disk support foot is not substantially axially extending beyond the diameter of the spindle for loading the stack of disks onto the spindle;
    a pusher for separating at least one disk from the stack of disks on the spindle; and
    an upper plate for positioning the spindle within a disk housing, and wherein the disk housing includes a top support ring for positioning the spindle and upper plate within the disk housing.

14. An apparatus for writing on a stack of disks, the apparatus comprising:
    a housing;
    a disk dispenser, the disk dispenser comprising:
       a spindle having a first end and a second end, the second end having a disk support foot for supporting a stack of disks, wherein the disk support foot is movable from an extended position arranged to support a stack of disks and a withdrawn position arranged to allow loading of the stack of disks over the disk support foot and onto the spindle; and
       a pusher for separating at least one disk from the stack of disks on the spindle, wherein the disk pusher horizontally displaces a lower-most disk by engaging an outer edge of the lower-most disk; and
    a disk writer.

15. The apparatus of claim 14, further comprising a spacer located between the second end of the spindle and the disk support foot.

16. The apparatus of claim 14, wherein the disk support foot is rotatable.

17. The apparatus of claim 14, further comprising an upper plate for positioning the spindle within a disk housing.

18. The apparatus of claim 14, further comprising a retainer foot located adjacent to the pusher and contacts an underside of a lower-most disk of the stack of disks.

19. The apparatus of claim 18, wherein the pusher separates the lower-most disk from the stack of disks.

20. The apparatus of claim 14, wherein the housing includes a disk drive.

21. The apparatus of claim 14, wherein the housing includes a copy board.

22. The apparatus of claim 14, wherein the pusher is slidably mounted above a retainer foot and the pusher selectively dispenses the lower-most disk from the stack.

23. An apparatus for writing on a stack of disks, the apparatus comprising:

a housing;

a disk dispenser, the disk dispenser comprising:

a spindle having a first end and a second end, the second end having a disk support foot for supporting a stack of disks, wherein the disk support foot is movable from an extended position arranged to support a stack of disks and a withdrawn position arranged to allow loading of the stack of disks over the disk support foot and onto the spindle; and a pusher for separating at least one disk from the stack of disks on the spindle;

a disk writer; and a tray for receiving the at least one disk from the stack of disks.

24. The apparatus of claim 23, wherein tray has a pair of support members for supporting the at least one disk in a first position and releasing the at least one disk to a hopper in a second position.

25. The apparatus of claim 24, further comprising a servomotor for controlling the support members of the tray.

* * * * *